US009345007B2

(12) United States Patent
Lee et al.

(10) Patent No.: US 9,345,007 B2
(45) Date of Patent: May 17, 2016

(54) METHOD FOR TRANSMITTING UPLINK CONTROL INFORMATION IN A WIRELESS COMMUNICATION SYSTEM AND DEVICE FOR SAME

(75) Inventors: Seungmin Lee, Anyang-si (KR); Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 14/003,420

(22) PCT Filed: Apr. 4, 2012

(86) PCT No.: PCT/KR2012/002514
§ 371 (c)(1),
(2), (4) Date: Sep. 5, 2013

(87) PCT Pub. No.: WO2012/138112
PCT Pub. Date: Oct. 11, 2012

(65) Prior Publication Data
US 2013/0343322 A1 Dec. 26, 2013

Related U.S. Application Data

(60) Provisional application No. 61/471,212, filed on Apr. 4, 2011.

(51) Int. Cl.
*H04W 72/04* (2009.01)
*H04B 7/26* (2006.01)
(Continued)

(52) U.S. Cl.
CPC ......... *H04W 72/0413* (2013.01); *H04B 7/2656* (2013.01); *H04J 13/004* (2013.01);
(Continued)

(58) Field of Classification Search
None
See application file for complete search history.

(56) References Cited

U.S. PATENT DOCUMENTS

2008/0304467 A1* 12/2008 Papasakellariou et al. ... 370/344
2009/0041139 A1* 2/2009 Cho et al. ................ 375/260
(Continued)

FOREIGN PATENT DOCUMENTS

KR 10-2010-0019934 A 2/2010
KR 10-0956494 B1 5/2010
(Continued)

OTHER PUBLICATIONS

ZTE, "Discussion on Backhaul Uplink Control Channel," 3GPP TSG-RAN WG1 Meeting #59bis, R1-100540, Valencia, Spain, Jan. 18-22, 2010, pp. 1-6.

*Primary Examiner* — Diane Lo
(74) *Attorney, Agent, or Firm* — Birch, Stewart, Kolasch & Birch, LLP

(57) ABSTRACT

The present invention relates to a method for a receiving terminal to transmit uplink control information to a transmitting terminal in a wireless communication system. In more detail, the method for transmitting the uplink control information includes: mapping the uplink control information into at least one available symbol included in each of a first slot and a second slot of a specific subframe; applying a first orthogonal sequence corresponding to the first slot to the uplink control information mapped into the first slot and a second orthogonal sequence corresponding to the second slot to the uplink control information mapped into the second slot; and transmitting the uplink control information having the orthogonal sequence applied to the transmitting terminal. The first orthogonal sequence corresponds to the number of available symbols in the first slot and the second orthogonal sequence corresponds to the number of available symbols in the second slot.

8 Claims, 25 Drawing Sheets

(51) Int. Cl.
*H04J 13/00* (2011.01)
*H04J 13/18* (2011.01)
*H04L 5/00* (2006.01)

(52) U.S. Cl.
CPC ............. *H04J 13/18* (2013.01); *H04L 5/0026* (2013.01); *H04L 5/0053* (2013.01); *H04L 5/001* (2013.01); *H04L 5/0048* (2013.01); *H04L 5/0094* (2013.01)

(56) References Cited

U.S. PATENT DOCUMENTS

| | | | |
|---|---|---|---|
| 2009/0046646 A1* | 2/2009 | Cho et al. | 370/329 |
| 2009/0073955 A1* | 3/2009 | Malladi | 370/349 |
| 2010/0067461 A1 | 3/2010 | Kwak et al. | |
| 2010/0189040 A1 | 7/2010 | You et al. | |
| 2010/0278109 A1* | 11/2010 | Papasakellariou | H04L 5/0037 370/328 |
| 2011/0126071 A1 | 5/2011 | Han et al. | |
| 2011/0243066 A1* | 10/2011 | Nayeb Nazar et al. | 370/328 |
| 2011/0274059 A1* | 11/2011 | Brown et al. | 370/329 |
| 2012/0026934 A1 | 2/2012 | Park et al. | |
| 2012/0046032 A1* | 2/2012 | Baldemair et al. | 455/434 |

FOREIGN PATENT DOCUMENTS

| | | |
|---|---|---|
| KR | 10-0964697 B1 | 6/2010 |
| KR | 10-2010-0087675 A | 8/2010 |
| KR | 10-2010-0097063 A | 9/2010 |
| WO | 2011/019223 A2 | 2/2011 |

* cited by examiner

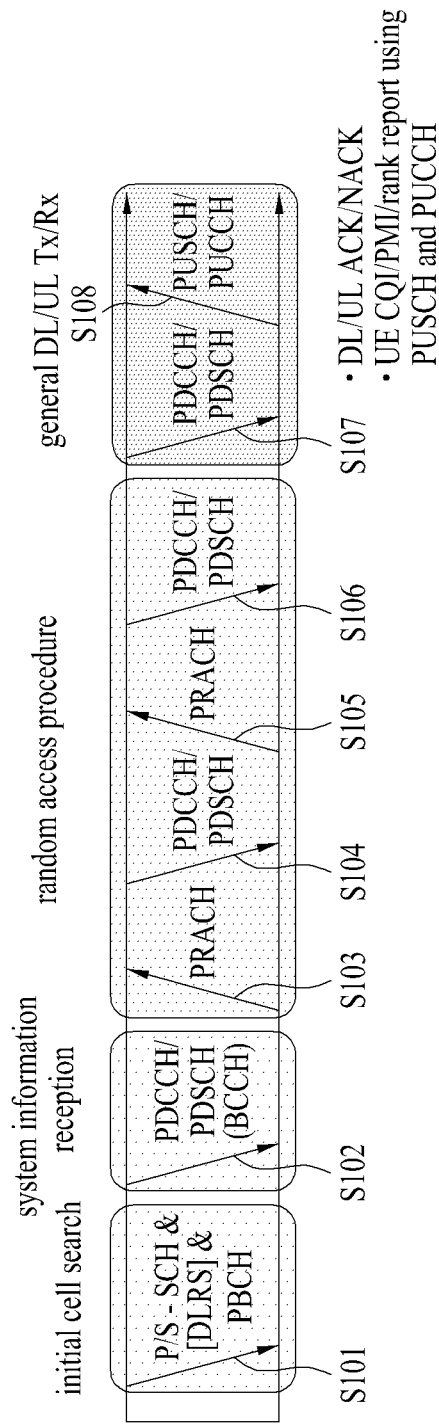

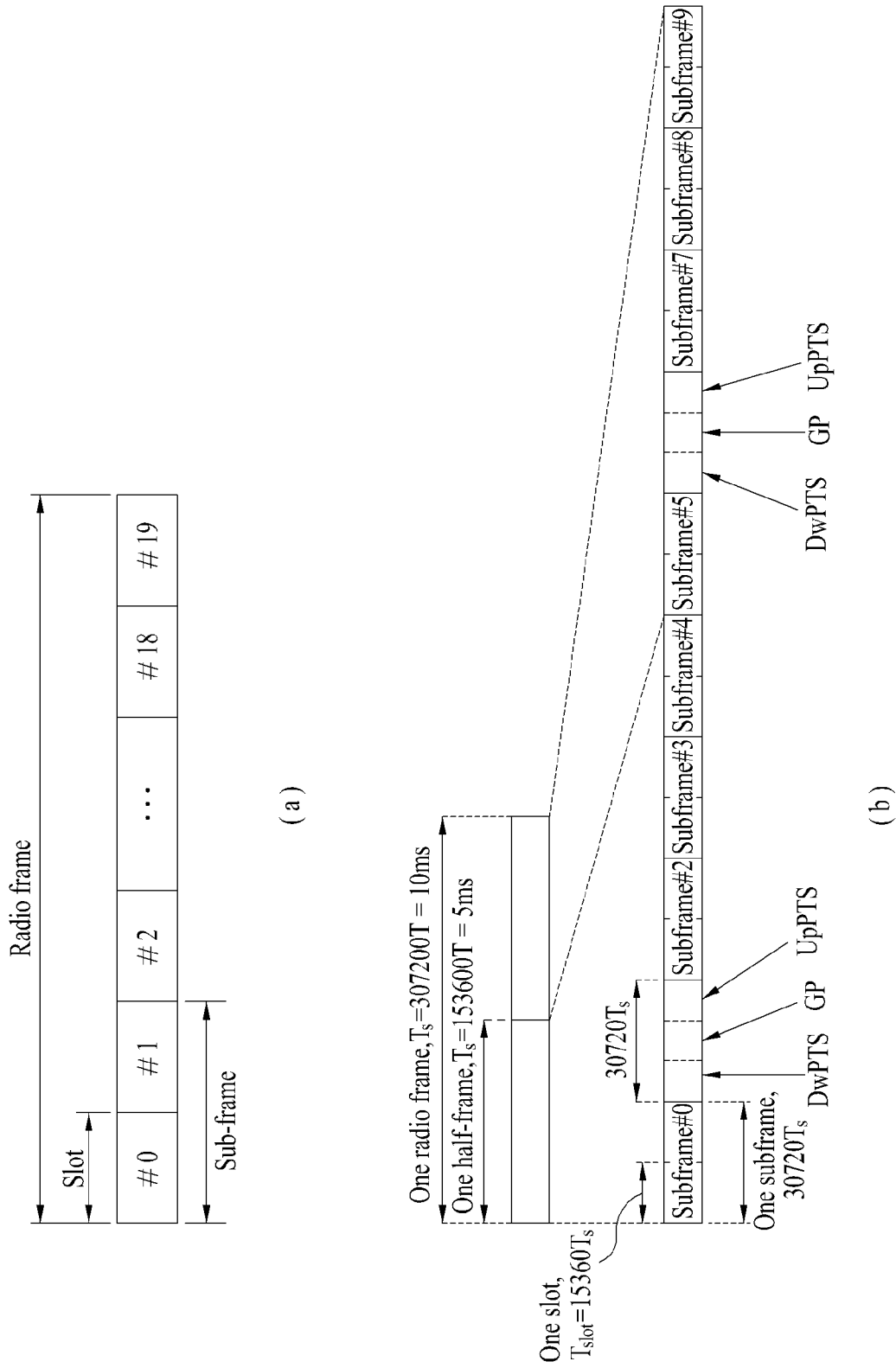

Reuse of LTE PUCCH format 2 structure (normal CP case)

METHOD FOR TRANSMITTING UPLINK CONTROL INFORMATION IN A WIRELESS COMMUNICATION SYSTEM AND DEVICE FOR SAME

CROSS-REFERENCE TO RELATED APPLICATIONS

This application is the National Phase of PCT/KR2012/002514 filed on Apr. 4, 2012, which claims priority under 35 U.S.C. 119(e) to U.S. Provisional Application No. 61/471,212 filed on Apr. 4, 2011, all of which are hereby expressly incorporated by reference into the present application.

TECHNICAL FIELD

The present invention relates to a method and apparatus for transmitting uplink control information in a wireless communication system.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the conventional problem is to provide a method and apparatus for transmitting uplink control information in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting uplink control information to a transmitter at a receiver in a wireless communication system includes mapping the uplink control information to one or more available symbols included in each of first and second slots of a specific subframe, applying a first orthogonal sequence corresponding to the first slot to the uplink control information mapped to the first slot and applying a second orthogonal sequence corresponding to the second slot to the uplink control information mapped to the second slot, and transmitting the uplink control information to which the orthogonal sequences are applied to the transmitter. The first orthogonal sequence corresponds to the number of available symbols included in the first slot and the second orthogonal sequence corresponds to the number of available symbols included in the second slot.

In another aspect of the present invention, a receiver in a wireless communication system includes a processor configured to map the uplink control information to one or more available symbols included in each of first and second slots of a specific subframe, to apply a first orthogonal sequence corresponding to the first slot to the uplink control information mapped to the first slot, and to apply a second orthogonal sequence corresponding to the second slot to the uplink control information mapped to the second slot, and a wireless communication module configured to transmit the uplink control information to which the orthogonal sequences are applied to a transmitter. The first orthogonal sequence corresponds to the number of available symbols included in the first slot and the second orthogonal sequence corresponds to the number of available symbols included in the second slot.

The number of available symbols included in the specific subframe may be changed according to subframe transmission and reception timings of the receiver and the transmitter. For example, one or more first and last successive symbols of the specific frame may be unavailable symbols.

The one or more symbols used to transmit the reference signal in each of the first and second slots may be excluded from the available symbols and the one or more symbols used to transmit the reference signal may be distributed uniformly in each of the first and second slots or symmetrically about a boundary between the first and second slots.

Advantageous Effects

According to the present invention, uplink control information can be efficiently transmitted in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 1 illustrates physical channels and a general signal transmission method using the physical channels in a $3^{rd}$ Generation Partnership Project Long Term Evolution (3GPP LTE) system as an exemplary wireless communication system;

FIG. 2A illustrates a structure of a radio frame;

BEST MODE FOR CARRYING OUT THE INVENTION

Figure 2B:
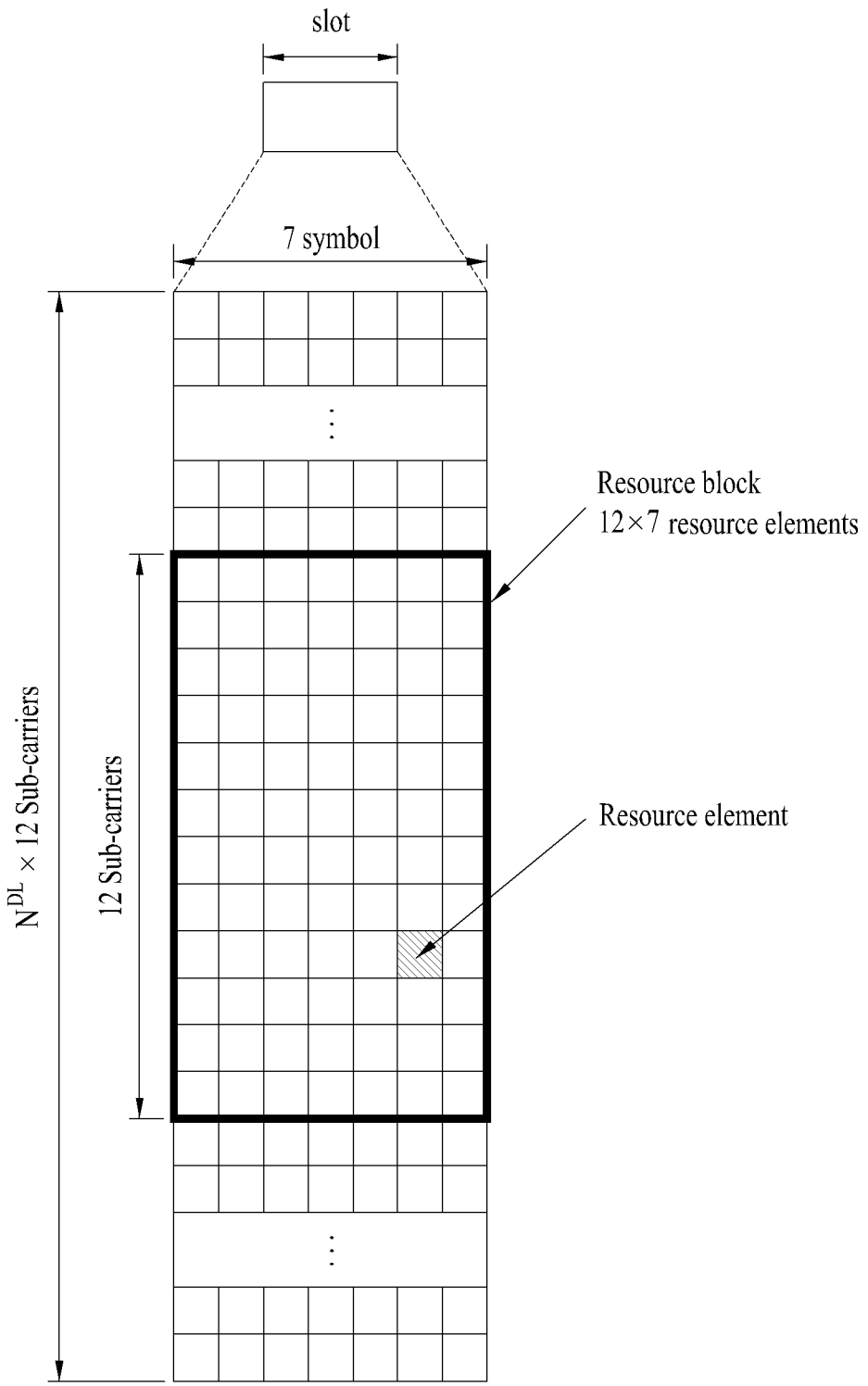
FIG. 2B illustrates a structure of a downlink resource grid for the duration of one downlink slot.

The technical features of the present invention as described hereinbelow can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications/General Packet Radio Service/Enhanced Data Rates for GSM Evolution (GSM/GPRS/EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved-UMTS (E-UMTS) using E-UTRA. 3GPP LTE employs OFDMA for downlink and SC-FDMA for uplink. LTE-A is an evolution of 3GPP LTE.

For clarity of description, the following description focuses on the 3GPP LTE/LTE-A system. However, the technical features of the present invention are not limited thereto. Specific terms used in the following description are provided to help the understanding of the present invention. These specific terms may be replaced with other terms within the scope and spirit of the present invention.

In a wireless communication system, a User Equipment (UE) receives information from an evolved Node B (eNB or eNode B) on a DownLink (DL) and transmits information to the eNB on an UpLink (UL). Data and various types of control information are transmitted and received between the eNB and the UE and there are various physical channels according to the types/usages of the transmitted and received data and control information.

FIG. 1 illustrates physical channels and a general method for transmitting signals on the physical channels in a 3GPP LTE system.

Referring to FIG. 1, when a UE is powered on or enters a new cell, the UE performs initial cell search (S101). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in a cell of the eNB by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S102).

Then to completely access the eNB, the UE may perform a random access procedure with the eNB as in steps S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE may additionally perform a contention resolution procedure including transmission of an additional PRACH (S105) and reception of a PDCCH and a PDSCH associated with the PDCCH (S106).

After the above procedure, the UE may receive a PDCCH and/or a PDSCH from the eNB (S107) and transmit a Physical Uplink Shared Channel (PUSCH) and/or a Physical Uplink Control Channel (PUCCH) to the eNB (S108), which is a general DL and UL signal transmission procedure. Control information that the UE transmits to the eNB is called Uplink Control Information (UCI). The UCI includes a Hybrid Automatic Repeat reQuest ACKnowledgment/Negative ACKnowledgment (HARQ ACK/NACK), a Scheduling Request (SR), Channel State Information (CSI), etc. In the present disclosure, an HARQ ACK/NACK is referred to shortly as an HARQ-ACK or ACK/NACK (A/N). CSI includes a Channel Quality Indicator (CQI), a Precoding Matrix Index (PMI), a Rank Indication (RI), etc. While UCI is transmitted generally on a PUCCH, if control information and traffic data are to be transmitted simultaneously, the UCI may be transmitted on a PUSCH. The UCI may be transmitted aperiodically on the PUSCH upon request/command of a network.

FIG. 2A illustrates an exemplary structure of a radio frame. In a cellular Orthogonal Frequency Division Multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 2A(a) is a diagram illustrating the structure of the type 1 radio frame. A DL radio frame includes 10 subframes, each subframe including two slots in the time domain. A time required for transmitting one subframe is defined as a Transmission Time Interval (TTI). For example, one subframe may be 1 ms long and one slot may be 0.5 ms long. One slot includes a plurality of OFDM symbols in the time domain and a plurality of Resource Blocks (RBs) in the frequency domain. Since the 3GPP LTE system uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a Cyclic Prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is instable as is the case with a fast UE, the extended CP may be used in order to further reduce inter-symbol interference.

In the case of the normal CP, since one slot includes 7 OFDM symbols, one subframe includes 14 OFDM symbols. Up to first three OFDM symbols of each subframe may be allocated to a PDCCH and the remaining OFDM symbols may be allocated to a PDSCH.

FIG. 2A(b) illustrates the structure of the type 2 radio frame. The type 2 radio frame includes two half frames, each half frame including 5 subframes, a Downlink Pilot Time Slot (DwPTS), a Guard Period (GP), and an Uplink Pilot Time Slot (UpPTS). One subframe is divided into two slots. The DwPTS is used for initial cell search, synchronization, or channel estimation at a UE, and the UpPTS is used for channel estimation and UL transmission synchronization with a UE at an eNB. The GP is used to cancel UL interference between UL and DL, caused by the multi-path delay of a DL signal.

The structures of radio frames are only exemplary. Accordingly, the number of subframes in a radio frame, the number of slots in a subframe, and the number of symbols in a slot may be changed in various manners.

FIG. 2B illustrates the structure of a DL resource grid for the duration of one DL slot.

Referring to FIG. 2B, a DL slot includes 7(6) OFDM symbols in the time domain and an RB includes 12 subcarriers in the frequency domain. Each element of the resource grid is referred to as a Resource Element (RE). An RB includes 12×7(6) REs. The number of RBs in a DL slot, $N^{DL}$ depends on a DL transmission bandwidth. A UL slot may have the same structure as a DL slot.

Figure 3:
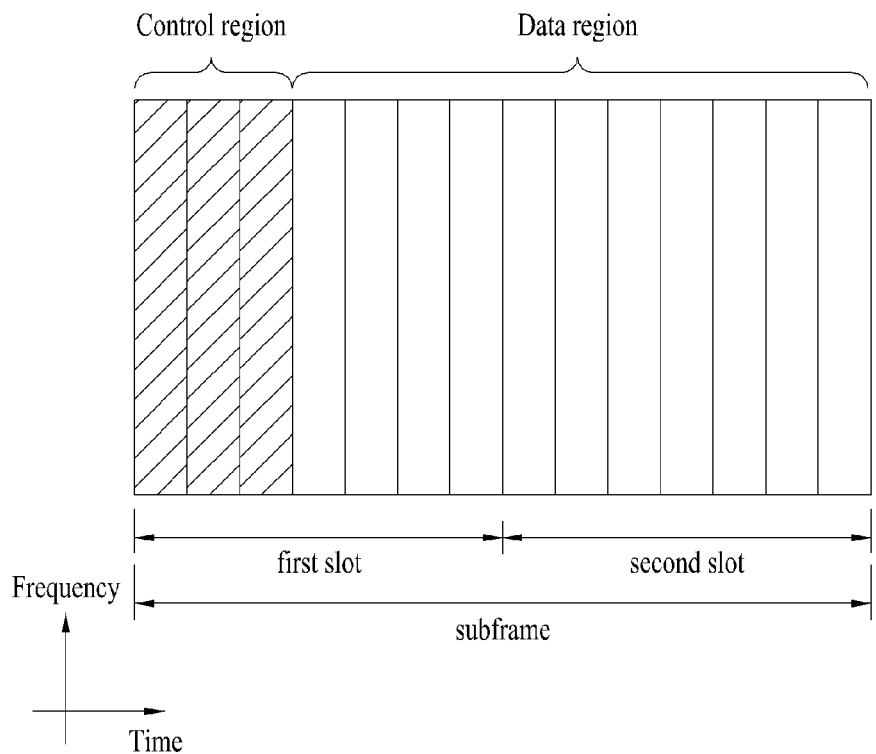
FIG. 3 illustrates a structure of a downlink frame.

FIG. 3 illustrates a structure of a DL subframe.

Referring to FIG. 3, up to three or four OFDM symbols at the start of the first slot of a DL subframe are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a Physical Downlink Control Channel (PDCCH), and a Physical Hybrid ARQ Indicator Channel (PHICH). The PCFICH is located in the first OFDM symbol of a subframe, carrying information about the number of OFDM symbols used for transmission of control channels in the subframe. The PHICH delivers an HARQ ACK/NACK signal as a response to a UL transmission.

Control information carried on the PDCCH is called Downlink Control Information (DCI). The DCI transports resource allocation information and other control information for a UE or a UE group. For example, the DCI includes DL/UL scheduling information, UL Transmission (Tx) power control commands, etc.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, Tx power control commands, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of RE Groups (REGs). The format of a PDCCH and the number of available bits for the PDCCH are determined according to the number of CCEs. An eNB determines a PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is destined for a specific UE, the CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a random access response to a random access preamble transmitted by a UE, its CRC may be masked by a Random Access-RNTI (RA-RNTI).

Figure 4:
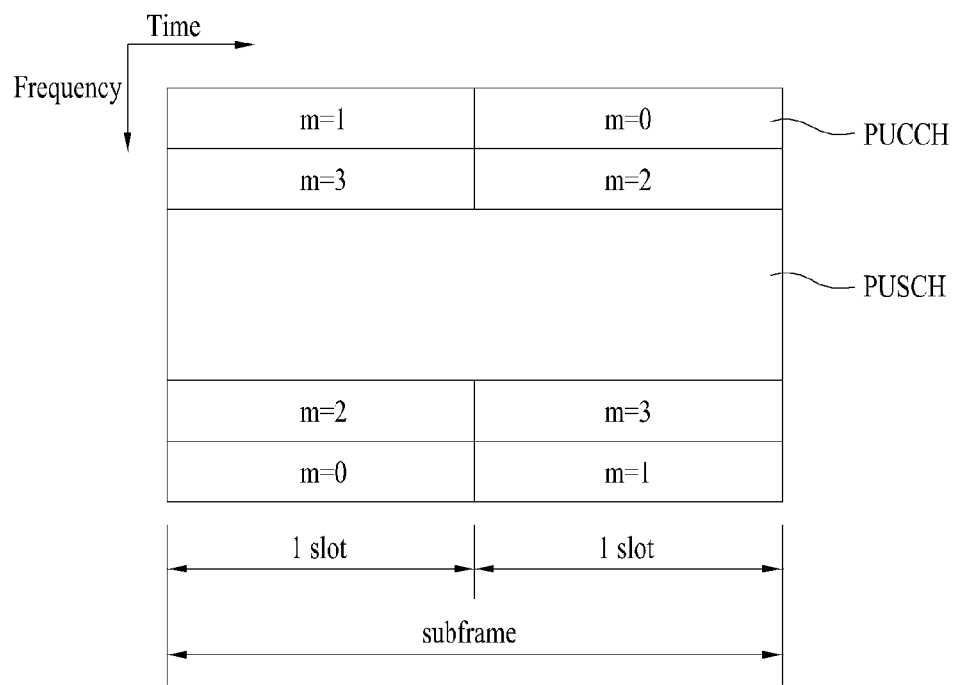
FIG. 4 illustrates a structure of an uplink subframe.

FIG. 4 illustrates a structure of a UL subframe in the 3 GPP LTE system.

Referring to FIG. 4, a UL subframe includes a plurality of (e.g. 2) slots. A slot may include a different number of SC-FDMA symbols according to a CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region on a frequency axis and the RB pair frequency-hops over a slot boundary.

The PUCCH may deliver the following control information.

SR: information requesting UL-SCH resources. An SR is transmitted in On-Off Keying (OOK).

HARQ ACK/NACK: a response signal to a DL data packet received on a PDSCH, indicating whether the DL data packet has been received successfully. A 1-bit ACK/NACK is transmitted as a response to a single DL codeword and a 2-bit ACK/NACK is transmitted as a response to two DL codewords.

CSI: feedback information regarding a DL channel. CSI includes a CQI and Multiple Input Multiple Output (MIMO)-related feedback information includes an RI, a PMI, a Precoding Type Indicator (PTI), etc. The CSI occupies 20 bits per subframe.

The amount of UCI that the UE may transmit in a subframe depends on the number of SC-FDMA symbols available for transmission of control information. The remaining SC-FDMA symbols except SC-FDMA symbols allocated to RSs in a subframe are available for transmission of control information. If the subframe carries a Sound Reference Signal (SRS), the last SC-FDMA symbol of the subframe is also excluded in transmitting the control information. The RSs are used for coherent detection of the PUCCH. The PUCCH supports seven formats according to information transmitted on the PUCCH.

[Table 1] illustrates a mapping relationship between PUCCH formats and UCI.

TABLE 1

| PUCCH format | Uplink Control Information (UCI) |
| --- | --- |
| Format 1 | SR (non-modulated waveform) |
| Format 1a | 1-bit HARQ ACK/NACK (presence/absence of SR) |
| Format 1b | 2-bit HARQ ACK/NACK (presence/absence of SR) |
| Format 2 | CSI (20 coded bits) |
| Format 2 | CSI and 1-bit or 2-bit HARQ ACK/NACK (20 bits) (only in the case of extended CP) |
| Format 2a | CSI and 1-bit HARQ ACK/NACK (20 + 1 coded bits) |
| Format 2b | CSI and 2-bit HARQ ACK/NACK (20 + 2 coded bits) |

An SRS is transmitted in the last symbol of a subframe on a time axis. SRSs transmitted in the last symbol of the same subframe from a plurality of UEs may be identified by their frequency positions/sequences. In the LTE system, an SRS is transmitted periodically. A periodic SRS transmission configuration is determined by cell-specific SRS parameters and UE-specific SRS parameters. The cell-specific SRS parameters (i.e. a cell-specific SRS configuration) and the UE-specific SRS parameters (i.e. a UE-specific SRS configuration) are transmitted to a UE by higher-layer signaling (e.g. Radio Resource Control (RRC) signaling).

The cell-specific SRS parameters include srs-BandwidthConfig and srs-SubframeConfig. srs-BandwidthConfig provides information about a frequency band in which an SRS may be transmitted in a cell and srs-SubframeConfig provides information about a subframe in which the SRS may be transmitted in the cell. The UE-specific SRS parameters include srs-Bandwidth, srs-HoppingBandwidth, freqDomainPosition, srs-ConfigIndex, transmissionComb, and cyclicShift. srs-Bandwidth specifies a value used to set a frequency band in which the UE is to transmit an SRS. srs-HoppingBandwidth specifies a value used to set frequency hopping for the SRS. FreDomainPosition specifies a value used to determine a frequency position at which the SRS is to be transmitted. srs-ConfigIndex specifies a value used to configure a subframe in which the UE is to transmit the SRS. transmissionComb specifies a value used to set an SRS transmission comb and cyclicShift specifies a value used to set a cyclic shift for an SRS sequence.

Figure 5:
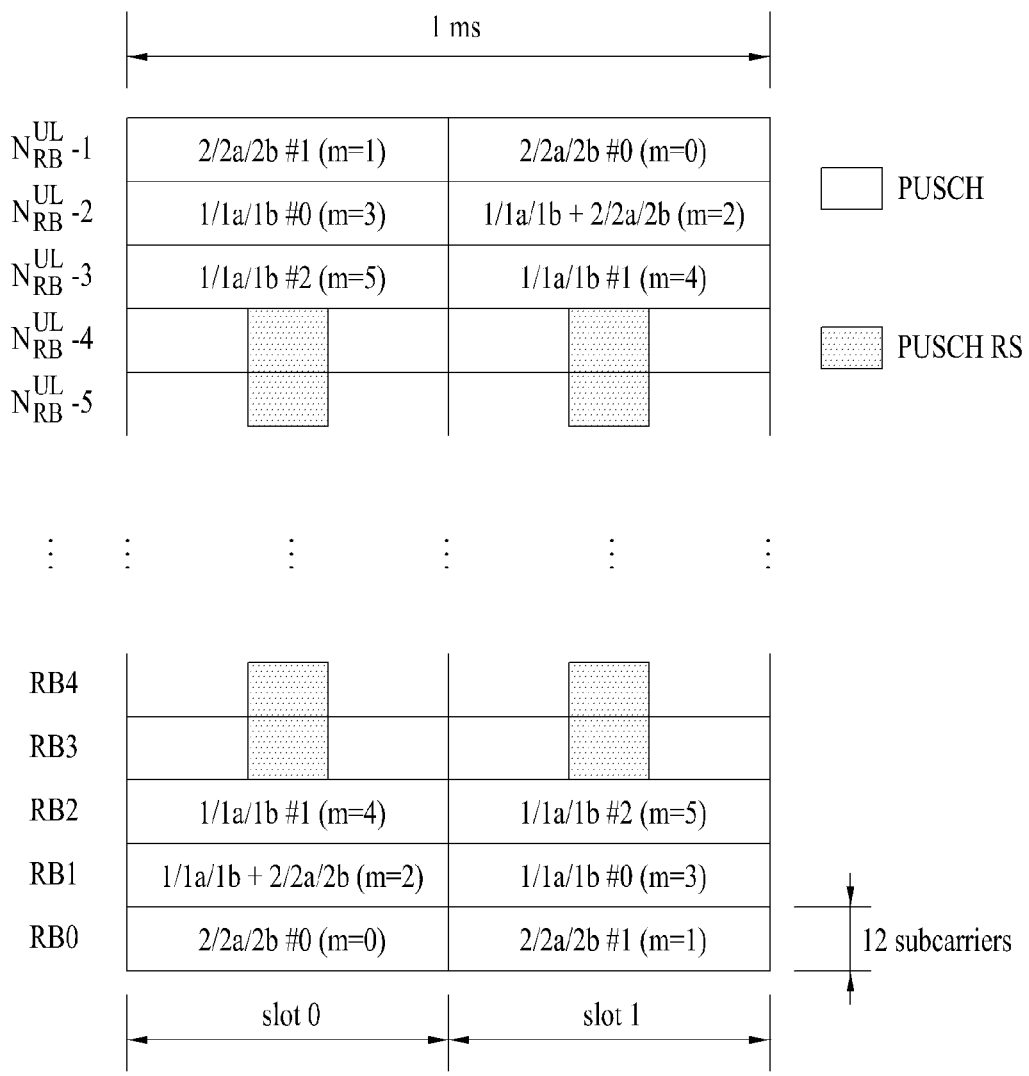
FIG. 5 illustrates an example of physically mapping Physical Uplink Control Channel (PUCCH) formats to PUCCH regions.

FIG. 5 illustrates an example of physically mapping PUCCH formats to PUCCH regions.

Referring to FIG. 5, the PUCCH formats are mapped to RBs, for transmission, from left to right starting from a band edge in the order of PUCCH format 2/2a/2b (CSI) (e.g. PUCCH regions m=0 and 1), PUCCH format 2/2a/2b (CSI) or PUCCH format 1/1a/1b (SR/HARQ ACK/NACK) (e.g. PUCCH region m=2 in the presence of an SR), and PUCCH format 1/1a/1b (SR/HARQ ACK/NACK) (e.g. PUCCH regions m=3, 4, and 5). The number of PUCCH RBs available for PUCCH format 2/2a/2b (CSI), $N_{RB}^{(2)}$ is indicated to a UE by broadcast signaling in a cell.

Figure 6:
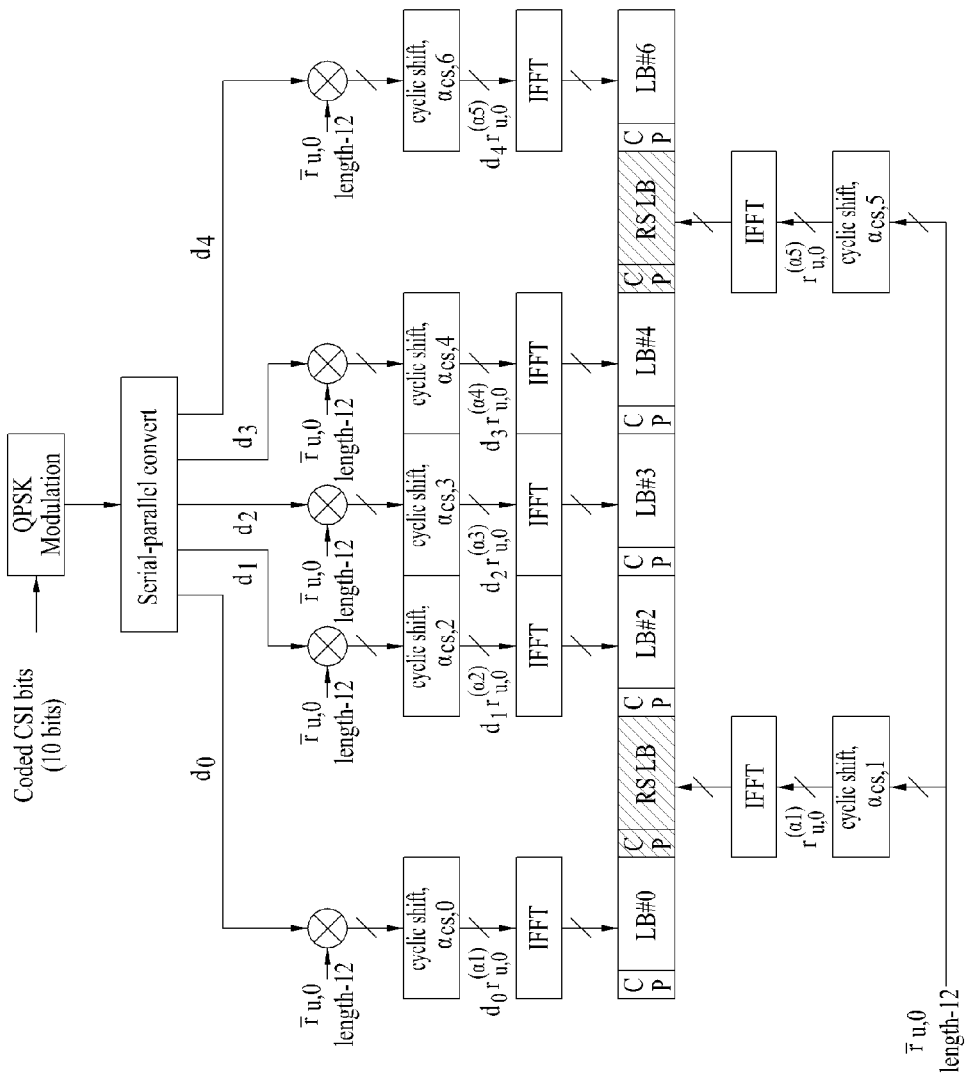
FIG. 6 illustrates a slot-level structure of PUCCH format 2/2a/2b.

FIG. 6 illustrates a slot-level structure of PUCCH format 2/2a/2b. PUCCH format 2/2a/2b is used for CSI transmission. CSI includes a CQI, a PMI, an RI, etc. In the case of a normal CP, SC-FDMA symbols (LB) #1 and #5 are used for transmission of Demodulation Reference Signals (DM RSs) in a slot, whereas in the case of an extended CP, only SC-FDMA symbol (LB) #3 is used for DM RS transmission in a slot.

Referring to FIG. 6, 10-bit CSI is channel-encoded at a subframe level to 20 coded bits using a rate 1/2 punctured (20, k) Reed-Muller code (not shown). Then the coded bits are scrambled (not shown) and mapped to a Quadrature Phase Shift Keying (QPSK) constellation (QPSK modulation). Similarly to PUSCH data scrambling, the CSI coded bits may be scrambled with a length-31 Gold sequence. 10 QPSK modulation symbols are generated and five QPSK symbols $d_0$ to $d_4$ are transmitted in corresponding SC-FDMA symbols in each slot. Each QPSK modulation symbol is used to modulate a length-12 base RS sequence $r_{u,0}$ before Inverse Fast Fourier Transform (IFFT). As a result, the RS sequence is cyclically shifted in the time domain according to the value of each QPSK symbol ($d_x * r_{u,0}^{(\alpha x)}$, x=0 to 4). The RS sequence multiplied by the QPSK modulation symbols is cyclically shifted ($\alpha_{cs,x}$, x=1 and 5). If the number of Cyclic Shift (CS) values is N, N UEs may be multiplexed in the same CSI PUCCH RB. Although a DM RS sequence is similar to a CSI sequence in the frequency domain, the DM RS sequence is not modulated with CSI modulation symbols.

Parameters/resources for periodic CSI reporting are configured semi-statically by higher-layer signaling (e.g. RRC signaling). For example, once a PUCCH resource index $n_{PUCCH}^{(2)}$ for CSI transmission is set, CSI is transmitted periodically on a CSI PUCCH linked to the PUCCH resource index $n_{PUCCH}^{(2)}$. The PUCCH resource index indicates a PUCCH RB and a CS value $\alpha_{cs}$.

Figure 7:
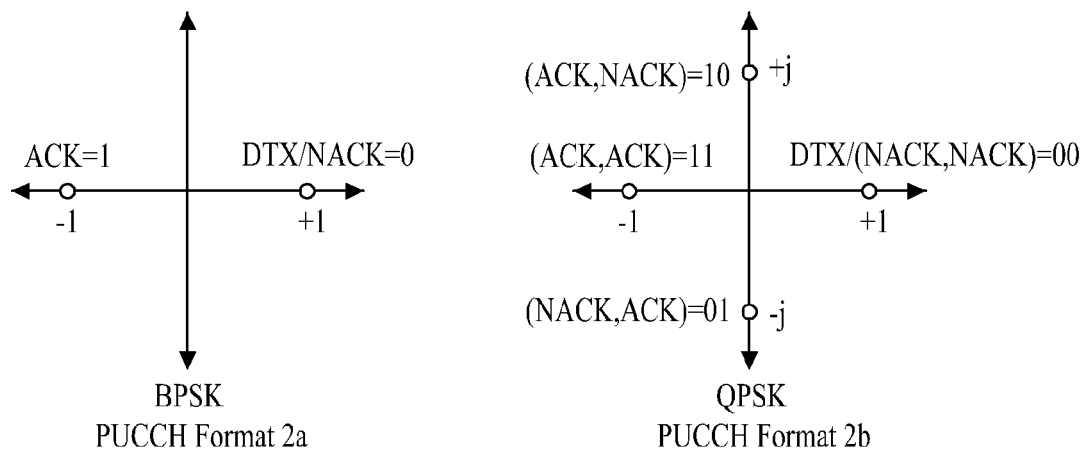
FIGS. 7 and 8 illustrate an exemplary method for multiplexing an ACKnowledgment/Negative ACKnowledgment (ACK/NACK or A/N) with Channel State Information (CSI) at a User Equipment (UE)
Figure 8:
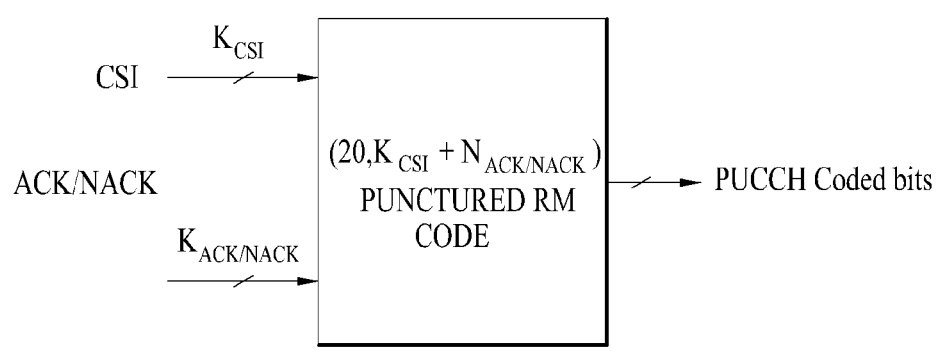

FIGS. 7 and 8 illustrate an exemplary method of multiplexing an ACK/NACK with CSI.

In the LTE system, simultaneous transmission of an ACK/NACK and CSI from a UE is triggered by UE-specific higher-layer signaling. If simultaneous transmission of an ACK/NACK and CSI is not triggered and an ACK/NACK is to be transmitted on a PUCCH in a subframe configured for CSI reporting, the CSI is dropped and only the ACK/NACK is transmitted in PUCCH format 1a/1b. In a subframe that an eNB allows a UE to simultaneously transmit an ACK/NACK and CSI, the UE multiplexes CSI with a 1-bit or 2-bit ACK/NACK in the same PUCCH RB. This method is implemented differently in the cases of an extended CP and a normal CP.

In the case of a normal CP, the UE modulates a (non-scrambled) ACK/NACK bit(s) in BPSK/QPSK as illustrated in FIG. 7 in order to transmit the 1-bit or 2-bit ACK/NACK and the CSI together. Thus one ACK/NACK modulation symbol $d_{HARQ}$ is generated. An ACK is encoded to a binary value '1' and a NACK is encoded to a binary value '0'. The single ACK/NACK modulation symbol $d_{HARQ}$ is subsequently used to modulate a second RS (i.e. SC-FDMA symbol #5) in each slot. That is, the ACK/NACK is signaled by an RS designed for PUCCH format 2a/2b. The CSI is carried in a UCI data part of PUCCH format 2a/2b. FIG. 7 illustrates exemplary modulation of a NACK (or NACK and NACK in the case of two MIMO codewords) to +1 (no RS modulation). Discontinuous Transmission (DTX) is handled as a NACK. DTX means that the UE has failed in detecting a DL grant PDCCH.

In the case of an extended CP (one RS symbol per slot), the 1-bit or 2-bit ACK/NACK and the CSI are jointly encoded. Thus (20, $k_{CSI}+k_{A/N}$) Reed-Muller-based block code is generated. A 20-bit codeword is transmitted on a PUCCH in the CSI channel structure illustrated in FIG. 6. The ACK/NACK and the CSI are jointly encoded as illustrated in FIG. 8. The maximum number of information bits supported by a block code is 13. If two codewords are transmitted on a DL, $k_{CSI}=11$ CSI bits and $k_{A/N}=2$ bits.

Figure 9:
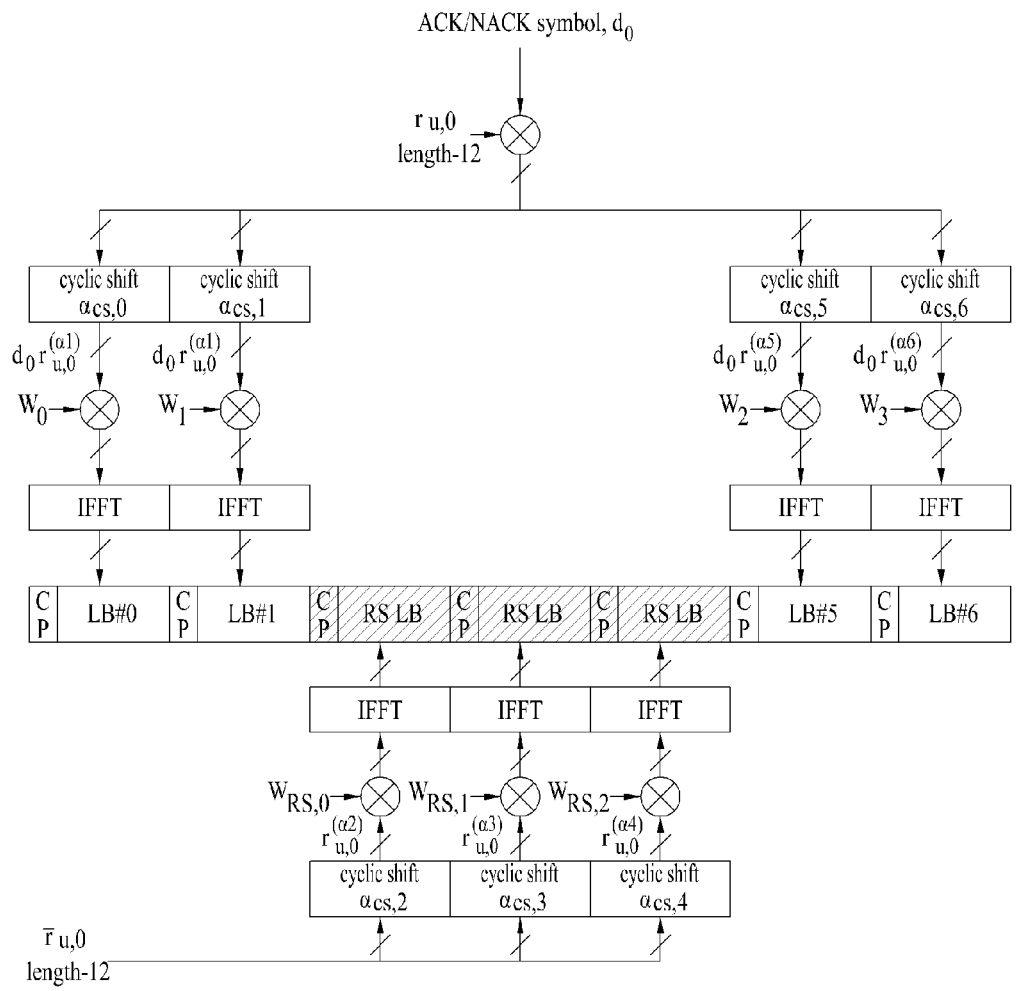
FIG. 9 illustrates a slot-level structure of PUCCH format 1a/1b.

FIG. 9 illustrates a slot-level structure of PUCCH format 1a/1b. PUCCH format 1a/1b is used for ACK/NACK transmission. In the case of a normal CP, SC-FDMA LBs #2, #3, and #4 are used for DM RS transmission, whereas in the case of an extended CP, SC-FDMA LBs #2 and #3 are used for DM RS transmission. Therefore, four SC-FDMA LBs are used for ACK/NACK transmission.

Referring to FIG. 9, 1-bit ACK/NACK information and 2-bit ACK/NACK information are modulated in BPSK and QPSK, respectively. Thus one ACK/NACK modulation symbol $d_0$ is generated. The ACK/NACK information is 1 for an ACK and 0 for a NACK. [Table 2] is a modulation table defined for PUCCH formats 1a and 1b in the legacy LTE system.

TABLE 2

| PUCCH format | $b(0), \ldots, b(M_{bit}-1)$ | $d(0)$ |
|---|---|---|
| 1a | 0 | 1 |
|  | 1 | -1 |
| 1b | 00 | 1 |
|  | 01 | -j |
|  | 10 | j |
|  | 11 | -1 |

Like the afore-described CSI, PUCCH format 1a/1b is characterized by time-domain spreading with an orthogonal spreading code (e.g. a Walsh-Hadamard or DFT code) $w_0, w_1, w_2, w_3$ as well as cyclic shifting in the frequency domain ($\alpha_{cs,x}$). Because code multiplexing is performed in both the frequency domain and the time domain, PUCCH format 1a/1b enables multiplexing of more UEs in the same PUCCH RB.

RSs transmitted from different UEs are multiplexed in the same manner as UCI. The number of CS values supported in SC-FDMA symbols of a PUCCH ACK/NACK RB may be determined by a cell-specific higher-layer signaling parameter $\Delta_{shift}^{PUCCH}$. If $\Delta_{shift}^{PUCCH} \in \{1, 2, 3\}$, this means that the CS values are 12, 6, and 4. The number of spreading codes available for an ACK/NACK in time-domain CDM may be limited by the number of RS symbols. This is because the multiplexing capacity of RS symbols is smaller than that of UCI symbols due to a small number of RS symbols.

Figure 10:
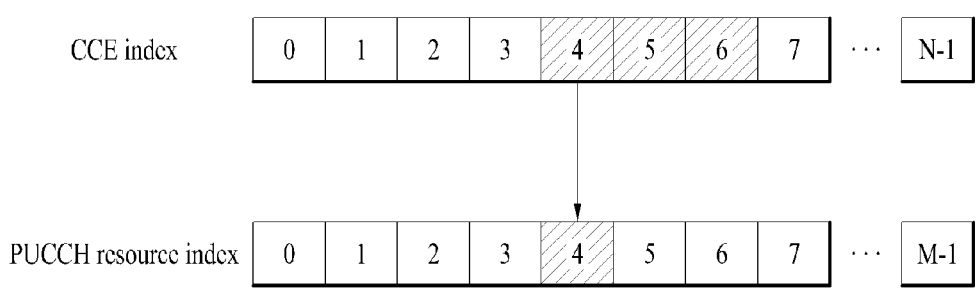
FIG. 10 illustrates an example of determining PUCCH resources for an ACK/NACK.

FIG. 10 illustrates an example of determining PUCCH resources for an ACK/NACK. In the LTE system, a plurality of PUCCH resources are shared among a plurality of UEs in a cell at each time point, rather than PUCCH resources for an ACK/NACK are allocated to each UE in advance. Specifically, PUCCH resources in which a UE will transmit an ACK/NACK are determined by a PDCCH carrying scheduling information about corresponding DL data. A total region carrying PDCCHs in each DL subframe includes a plurality of CCEs and a PDCCH directed to the UE includes one or more CCEs. The UE transmits an ACK/NACK in PUCCH resources mapped to a specific CCE (e.g. a first CCE) from among the CCEs of the received PDCCH.

Referring to FIG. 10, each square of a DL Component Carrier (CC) represents a CCE and each square of a UL CC represents a PUCCH resource. Each PUCCH index indicates a PUCCH resource for an ACK/NACK. If information about a PDSCH is delivered on a PDCCH including CCEs 4, 5, and 6 as illustrated in FIG. 10, the UE transmits an ACK/NACK in PUCCH 4 mapped to CCE 4 which is the first of the CCEs of the PDCCH. FIG. 10 illustrates an exemplary case in which there are up to M PUCCHs in a UL CC, for a DL CC having up to N CCEs. While N may be equal to M, N and M may be different and thus the CCEs may be mapped to the PUCCHs in an overlapped manner.

Specifically, PUCCH resource indexes are determined by the following equation in the LTE system.

$$n^{(1)}_{PUCCH} = n_{CCE} + N^{(1)}_{PUCCH} \qquad \text{[Equation 1]}$$

where $n^{(1)}_{PUCCH}$ is a resource index in PUCCH format 1, for transmission of ACK/NACK/DTX, $N^{(1)}_{PUCCH}$ is a value indicated by higher-layer signaling, and $n_{CCE}$ is the smallest of CCE indexes used for PDCCH transmission. A CS, an orthogonal spreading code, and a Physical Resource Block (PRB) for PUCCH format 1a/1b are acquired from $n^{(1)}_{PUCCH}$.

In an LTE-TDD system, a UE transmits one multiplexed ACK/NACK signal for a plurality of PDSCHs received in subframes different in time. Specifically, the UE transmits the multiplexed ACK/NACK signal for the plurality of PDSCHs in an ACK/NACK channel selection scheme (shortly, a channel selection scheme). The ACK/NACK channel selection scheme is also called a PUCCH selection scheme. In the ACK/NACK channel selection scheme, if the UE receives a plurality of DL data, the UE uses a plurality of UL physical channels to transmit a multiplexed ACK/NACK signal. For example, when the UE receives a plurality of PDSCHs, the UE may use as many PUCCHs according to specific CCEs of PDCCHs indicating the respective PDSCHs. In this case, the UE may transmit the multiplexed ACK/NACK signal on a PUCCH selected from among the plurality of PUCCHs using a modulation and coding scheme applied to the selected PUCCH.

[Table 3] illustrates an ACK/NACK channel selection scheme defined in the LTE system.

TABLE 3

| HARQ-ACK(0), HARQ-ACK(1), HARQ-ACK(2), HARQ-ACK(3) | Subframe | |
|---|---|---|
| | $n^{(1)}_{PUCCH,x}$ | b(0), b(1) |
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In [Table 3], HARQ-ACK(i) represents an HARQ ACK/NACK/DTX result for an $i^{th}$ data unit ($0 \le i \le 3$). The HARQ ACK/NACK/DTX result may be an ACK, a NACK, a DTX, or a NACK/DTX. DTX indicates non-transmission of a data unit corresponding to HARQ-ACK(i) or a UE's failure in detecting the data unit corresponding to HARQ-ACK(i). Up to four PUCCH resources (i.e. $n^{(1)}_{PUCCH,0} \sim n^{(1)}_{PUCCH,3}$) may be occupied for the data units. A multiplexed ACK/NACK for the data units is transmitted in one PUCCH resource selected from among the occupied PUCCH resources. In [Table 3], $n^{(1)}_{PUCCH,X}$ indicates an actual PUCCH resource used to transmit an ACK/NACK. b(0) and b(1) are two bits transmitted in the selected PUCCH resource, modulated in QPSK. For example, if the UE successfully decodes four data units, the UE transmits (1, 1) in a PUCCH resource of $n^{(1)}_{PUCCH,1}$. Since the PUCCH resource-QPSK symbol combinations are not sufficient to represent all possible ACK/NACK cases, NACK and DTX are coupled (NACK/DTX, N/D) except for some cases.

Figure 11:
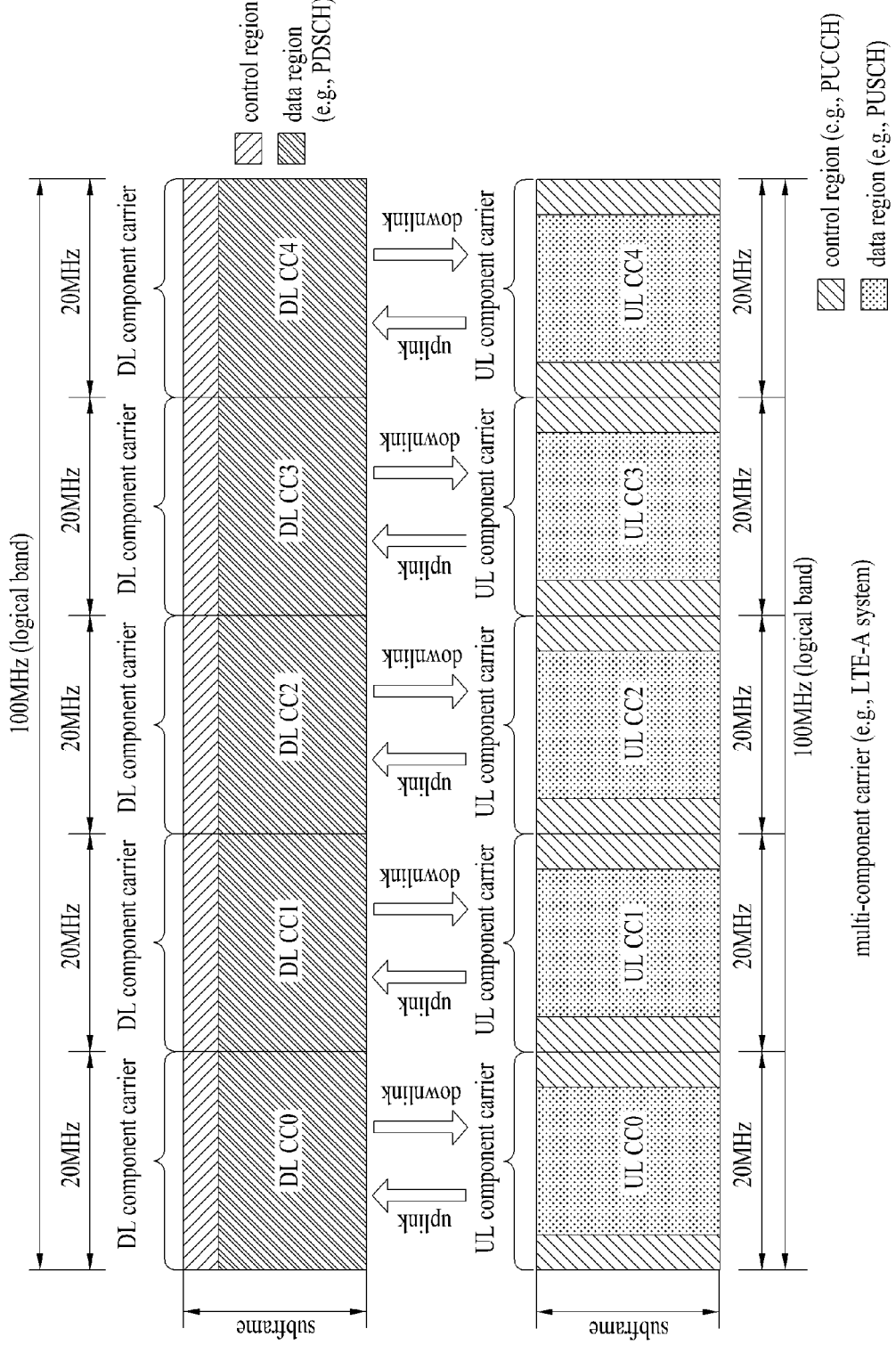
FIG. 11 illustrates an exemplary Carrier Aggregation (CA) communication system.

FIG. 11 illustrates an exemplary Carrier Aggregation (CA) communication system. The LTE-A system aggregates a plurality of UL/DL frequency blocks to a broader UL/DL bandwidth by CA in order to use a broader frequency band. Each frequency block is transmitted in a CC. A CC may be regarded as a carrier frequency (or a center carrier or center frequency) for a frequency block.

Referring to FIG. 11, a broader UL/DL bandwidth may be supported by aggregating a plurality of UL/DL CCs. The CCs may be contiguous or non-contiguous in the frequency domain. The bandwidth of each CC may be set independently. Asymmetrical CA is also possible by differentiating the number of UL CCs from the number of DL CCs. For example, given two DL CCs and one UL CC, the DL CCs are linked to the UL CC at 2:1. DL CC-UL CC linkage is fixed or configured semi-statically. Even though a total system band includes N CCs, a frequency band that a specific UE is allowed to monitor/receive may be limited to M (<N) CCs. Various CA parameters may be configured cell-specifically, UE group-specifically, or UE-specifically. Control information may be configured to be transmitted and received only in a specific CC. This specific CC may be referred to as a Primary CC (PCC or anchor CC) and the other CCs may be referred to as Secondary CCs (SCCs).

The LTE-A system uses the concept of cell to manage radio resources. A cell is defined as a combination of DL and UL resources, while the UL resources are optional. Accordingly, a cell may include DL resources only or both DL and UL resources. If CA is supported, the linkage between the carrier frequencies (or DL CCs) of DL resources and the carrier frequencies (or UL CCs) of UL resources may be indicated by system information. A cell operating in a PCC may be referred to as a Primary Cell (PCell) and a cell operating in an SCC may be referred to as a Secondary Cell (SCell). The PCell is used for a UE to establish an initial connection or to re-establish a connection. The PCell may be a cell indicated during handover. The SCell may be configured after an RRC connection is established and used to provide additional radio resources. Both a PCell and an SCell may be collectively referred to as a serving cell. Accordingly, if CA has not been configured for a UE in RRC_CONNECTED state or the UE in RRC_CONNECTED state does not support CA, one serving cell including only a PCell exists for the UE. On the other hand, if CA has been configured for a UE in RRC_CONNECTED state, one or more serving cells including a PCell and total SCells exist for the UE for. For CA, a network may add one or more SCells to a PCell initially configured during connection establishment, for a UE after initial security activation is initiated.

If cross-carrier scheduling (or cross-CC scheduling) is used, a DL assignment PDCCH may be transmitted in DL CC #0 and a PDSCH associated with the PDCCH may be transmitted in DL CC #2. For cross-CC scheduling, a Carrier Indicator Field (CIF) may be introduced. The existence or absence of a CIF in a PDCCH may be determined semi-statically and UE-specifically (or UE group-specifically) by higher-layer signaling (e.g. RRC signaling). The baseline of PDCCH transmission is summarized as follows.

CIF disabled: a PDCCH in a DL CC allocates PDSCH resources of the same DL CC or PUSCH resources of one linked UL CC.

CIF enabled: a PDCCH in a DL CC may allocate PDSCH resources or PUSCH resources of a specific DL/UL CC from among a plurality of aggregated DL/UL CCs using a CIF.

In the presence of a CIF, an eNB may allocate a PDCCH monitoring DL CC set to a UE in order to reduce blind decoding complexity of the UE. The PDCCH monitoring DL CC set is a part of total aggregated DL CCs, including one or more DL CCs. The UE detects/decodes a PDCCH only in the DL CCs of the PDCCH monitoring DL CC set. The PDCCH monitoring DL CC set may be configured UE-specifically, UE group-specifically, or cell-specifically. The term 'PDCCH monitoring DL CC' may be replaced with an equivalent term such as monitoring carrier, monitoring cell, etc. In addition, the term CCs aggregated for a UE may be interchangeably used with an equivalent term such as serving CCs, serving carriers, serving cells, etc.

Figure 12:
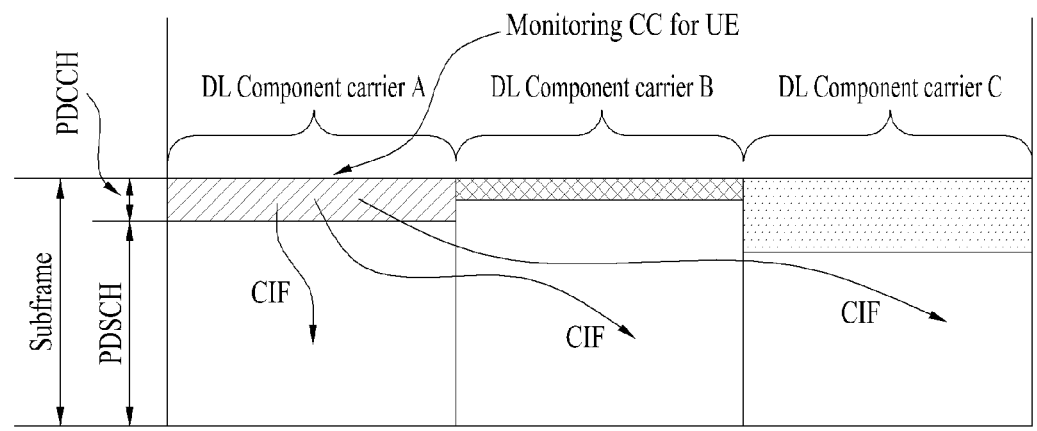
FIG. 12 illustrates an exemplary cross-carrier scheduling.

FIG. 12 illustrates an exemplary scheduling, when a plurality of carriers are aggregated. It is assumed that three DL CCs are aggregated and DL CC A is set as a PDCCH monitoring DL CC. DL CCs A, B, and C may be referred to as serving CCs, serving carriers, serving cells, etc. If a CIF is disabled, each DL CC may deliver only a PDCCH that schedules a PDSCH in the DL CC, without a CIF according to an LTE PDCCH rule. On the other hand, if a CIF is enabled by UE-specific (UE group-specific or cell-specific) higher-layer signaling, DL CC A (i.e. the monitoring DL CC) may deliver a PDCCH that schedules a PDSCH of another CC as well as a PDCCH that schedules a PDSCH of DL CC A, using the CIF. In this case, no PDCCH is transmitted in DL CCs B and C that are not set as PDCCH monitoring DL CCs. The LTE-A system considers transmission of a plurality of pieces of ACK/NACK information/a plurality of ACK/NACK signals in a specific UL CC, for a plurality of PDSCHs transmitted in a plurality of DL CCs. For this purpose, the plurality of ACK/NACK signals may be jointly encoded (e.g. using a Reed-Muller code, a Tail-biting convolutional code, etc.) and then the jointly encoded ACK/NACK information/signal may be transmitted in PUCCH format 2 or a new PUCCH format (referred to as an Enhanced PUCCH (E-PUCCH) format or PUCCH format 3). PUCCH format 3 includes the following block spreading-based PUCCH format. For example, the jointly encoded ACK/NACK signal may be transmitted in PUCCH format 2/PUCCH format 3, without restrictions on UCI transmission. For example, PUCCH format 2/PUCCH format 3 may be used in transmitting an ACK/NACK, CSI (e.g. a CQI, a PMI, an RI, a PTI, etc.), and an SR alone or in combination. Accordingly, PUCCH format 2/PUCCH format 3 may be used in transmitting jointly encoded UCI codewords irrespective of the types/number/sizes of UCI.

Figure 13:
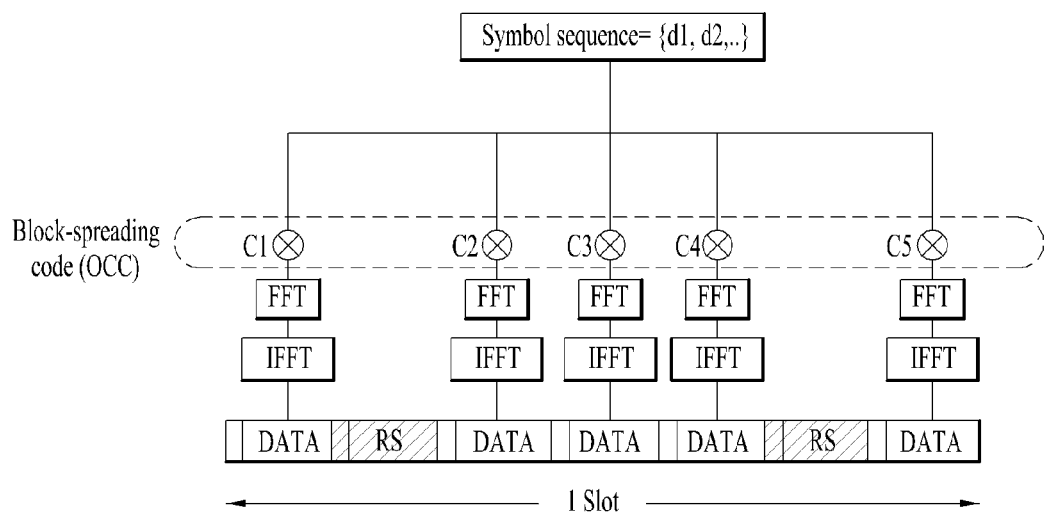
FIGS. 13 and 14 illustrate exemplary block spreading-based PUCCH format 3.

FIG. 13 illustrates exemplary PUCCH format 3 based on block spreading at a slot level. In PUCCH format 2 of the legacy LTE system, one symbol sequence (d0 to d4 in FIG. 6) is transmitted in the time domain and UEs are multiplexed using CSs $\alpha_{cs,x}$ (x=0 to 4) of a Constant-Amplitude Zero Auto-Correlation (CAZAC) sequence $r_{u,0}$ as illustrated in FIG. 6. In contrast, in PUCCH format 3, one symbol sequence is transmitted in the frequency domain and UEs are multiplexed by time-domain spreading using Orthogonal Cover Codes (OCCs) on a block basis. That is, the symbol sequence is spread with an OCC in the time domain. Control signals of a plurality of UEs may be multiplexed into the same RB using OCCs.

Referring to FIG. 13, five SC-FDMA symbols (i.e. a UCI data part) are generated from one symbol sequence {d1, d2, ...} using a length-5 OCC with Spreading Factor (SF)=5, C1 to C5. The symbol sequence {d1, d2, ...} may be a modulation symbol sequence or a codeword bit sequence. If the symbol sequence {d1, d2, ...} is a codeword bit sequence, a modulation block is further included in the block diagram of FIG. 13. While two RS symbols (i.e. an RS part) are transmitted in one slot in FIG. 13, many other applications may be contemplated, including using an RS part with three RS symbols and a UCI data part configured with an OCC with SF=4. The RS symbols may be generated by cyclically shifting a CAZAC sequence by a predetermined CS value. In addition, a plurality of time-domain RS symbols may be multiplied by a specific OSS and then transmitted. Block-spread UCI is transmitted to a network after it is subject to Fast Fourier Transform (FFT) and Inverse Fast Fourier Transform (IFFT) on an SC-FDMA symbol basis. That is, the block-spreading scheme modulates the control information (e.g. an ACK/NACK, etc.) in SC-FDMA, as compared to the legacy PUCCH format 1 or 2 series.

Figure 14:
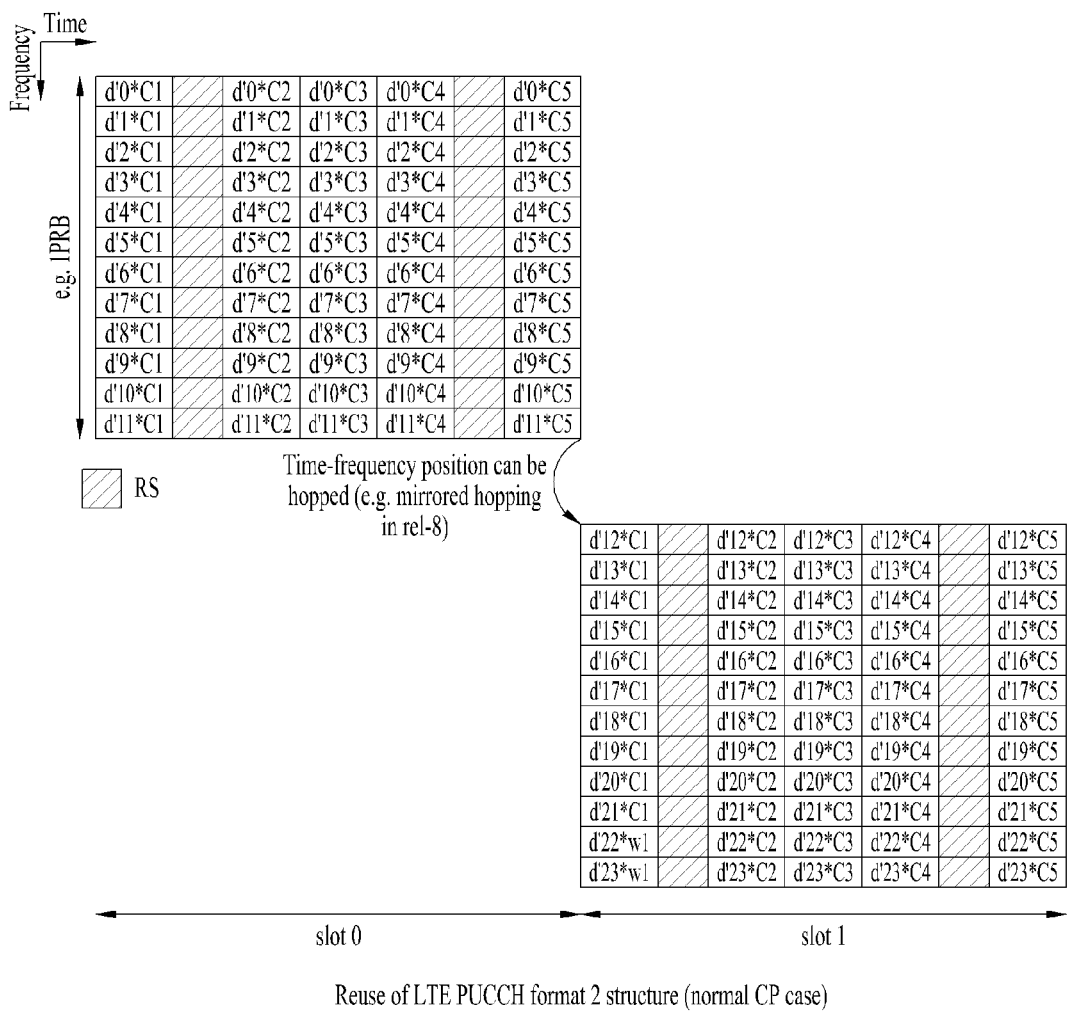

FIG. 14 illustrates exemplary PUCCH format 3 at a subframe level.

Referring to FIG. 14, a symbol sequence {d'0 to d'11} is mapped to subcarriers of an SC-FDMA symbol and mapped to five SC-FDMA symbols by block spreading using an OCC C1 to C5 in slot 0. Similarly, a symbol sequence {d'12 to d'23} is mapped to subcarriers of an SC-FDMA symbol and mapped to five SC-FDMA symbols by block spreading using the OCC C1 to C5 in slot 1. The symbol sequence of each slot, {d'0 to d'11} or {d'12 to d'23} is obtained by FFT-processing or FFT/IFFT-processing the symbol sequence {d1, d2, ...} illustrated in FIG. 13. If the symbol sequence {d'0 to d'11} or {d'12 to d'23} results from FFT-processing of the symbol sequence {d1, d2, ...} illustrated in FIG. 13, the symbol sequence {d'0 to d'11} or {d'12 to d'23} is additionally IFFT-processed to generate SC-FDMA symbols. The total symbol sequence {d'0 to d'23} is generated by jointly encoding one or more pieces of UCI. The former half of the symbol sequence {d'0 to d'23} is transmitted in slot 0 and the latter half of the symbol sequence {d'0 to d'23} is transmitted in slot 1. While not shown, different OCCs may be used in different slots and UCI data may be scrambled on an SC-FDMA symbol basis.

For the convenience of description, a scheme of transmitting channel coding-based UCI (e.g. a plurality of ACKs/NACKs) in PUCCH format 2 or the E-PUCCH format (i.e. PUCCH format 3) will be referred to as a 'multi-bit UCI coding' transmission scheme. For example, ACK/NACK information or DTX information (non-reception or non-detection of PDSCHs or PDCCHs) about PDSCHs of a plurality of DL cells and/or PDCCHs of the plurality of DL cells, indicating Semi-Persistent Scheduling (SPS) release is jointly encoded and the coded ACK/NACK block is transmitted in the multi-bit UCI coding transmission scheme. If a UE receives two codewords in a DL cell in a Single User Multiple Input Multiple Output (SU-MIMO) mode, there are a total of four feedback states for the cell, ACK/ACK, ACK/NACK, NACK/ACK, and NACK/NACK or a total of five feedback states for the cell by adding DTX to the four feedback states. If the UE receives a single codeword, there may be up to three states, ACK, NACK, and DTX (if NACK and DTX are handled equally, two states ACK and NACK/DTX may exist). Therefore, if the UE aggregates up to five DL cells and operates in every cell in the SU-MIMO mode, $5^5$ feedback states may be available at maximum. Accordingly, a required ACK/NACK payload size is at least 12 bits. If DTX and NACK are handled equally, the number of possible feedback states is $4^5$ and the required ACK/NACK payload size is at least 10 bits.

Meanwhile, when the channel state between an eNB and a UE is poor, a Relay Node (RN) may be installed between them to provide a better radio channel to the UE. In addition, use of an RN at a cell edge where a channel from an eNB is in poor state may provide a high-speed data channel and extend cell service coverage. RNs have been introduced to eliminate shadowing areas and are widely deployed in a wireless communication system.

Conventionally, relaying was confined to the function of a repeater that simply amplifies a signal and forwards the amplified signal. However, more intelligent relay schemes have recently been developed. Furthermore, relaying is a requisite technology to reduce eNB installation cost and backhaul maintenance cost, while extending service coverage and increasing data throughput in a future-generation mobile communication system. Along with the growth of relaying techniques, there exists a need to support an RN used in a conventional wireless communication system for a new wireless communication system.

In the 3GPP LTE-A system, with the introduction of a function of relaying a signal on a link between an eNB and a UE to an RN, two links having different attributes apply to each of DL and UL carrier frequency bands. A link between the eNB and the RN is defined as a backhaul link. A backhaul link through which a signal is transmitted using DL resources in Frequency Division Duplexing (FDD) or Time Division Duplexing (TDD) is called a backhaul DL, whereas a link through which a signal is transmitted using UL resources in FDD or TDD is called a backhaul UL.

Figure 15:
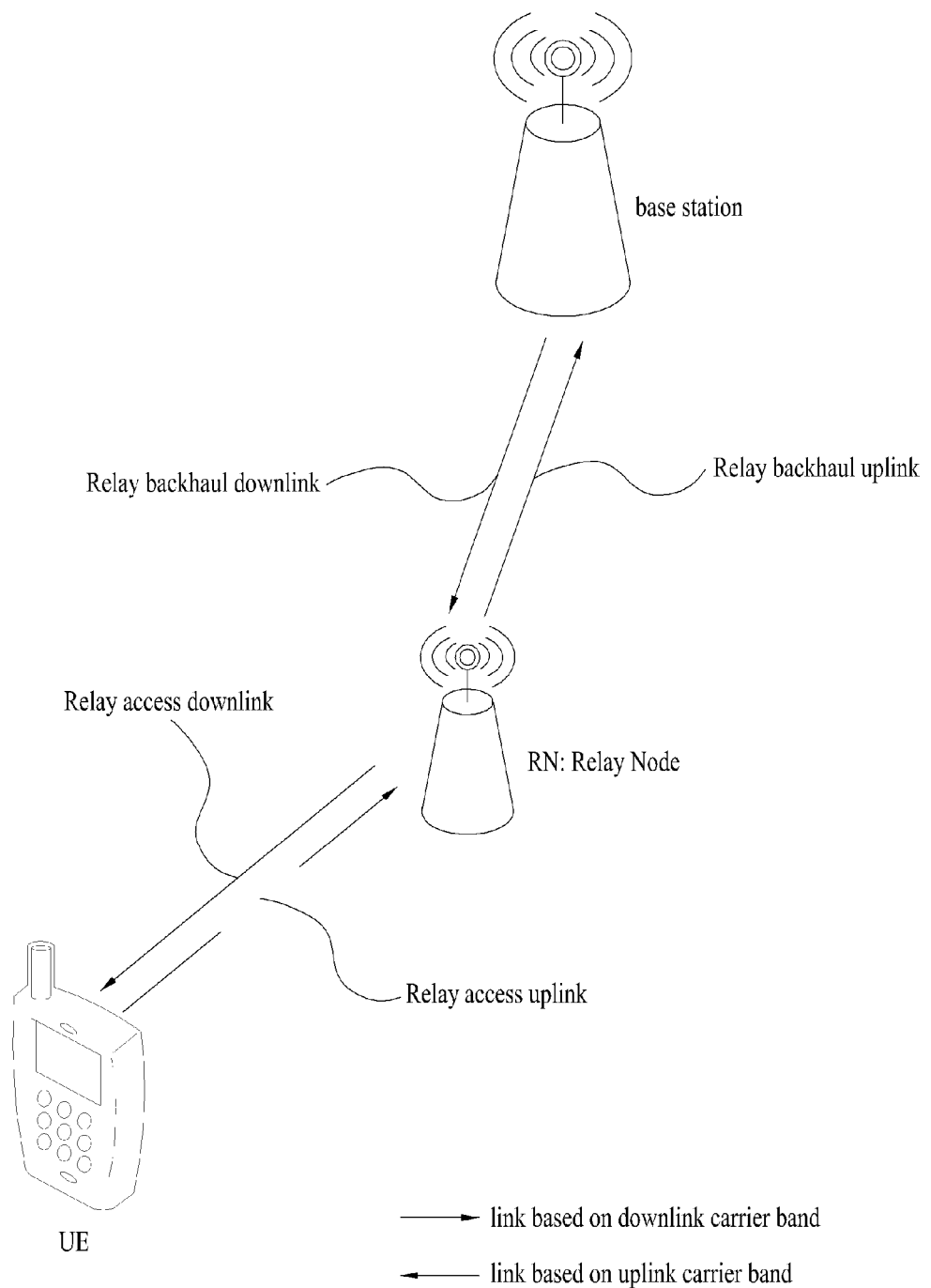
FIG. 15 illustrates a configuration of a relay backhaul link and a relay access link in a wireless communication system.

FIG. 15 illustrates a configuration of a relay backhaul link and a relay access link in a wireless communication system.

Referring to FIG. 15, with the introduction of a function of forwarding a signal on a link between an eNB and a UE to an RN, two links having different attributes apply to each of DL and UL carrier frequency bands. A link between the eNB and the RN is defined as a backhaul link. A backhaul link through which a signal is transmitted using DL resources in FDD or TDD is called a backhaul DL, whereas a link through which a signal is transmitted using UL resources in FDD or TDD is called a backhaul UL.

Meanwhile, a link between an RN and a UE is defined as a relay access link. A relay access link through which a signal is transmitted in a DL frequency band (in the case of FDD) or in DL subframe resources (in the case of TDD) is called an access DL, whereas a relay access link through which a signal is transmitted in a UL frequency band (in the case of FDD) or in UL subframe resources (in the case of TDD) is called an access UL.

An RN may receive information from an eNB through a relay backhaul DL and transmit information to the eNB through a relay backhaul UL. In addition, the RN may transmit information to a UE through a relay access DL and receive information from the UE through a relay access UL.

With respect to an RN's usage of a frequency band (or spectrum), its operation can be classified into in-band and out-band. For an in-band RN, a backhaul link shares the same frequency band with an access link. If the backhaul link and the access link operate in different frequency bands, the RN is an out-band RN. In both in-band and out-band relaying, a UE (legacy UE) operating in the conventional LTE system (e.g. Release-8) should be able to access a donor cell.

Depending on whether a UE is aware of the existence of an RN, RNs may be classified into a transparent RN and a non-transparent RN. If the UE does not perceive whether it communicates with a network via an RN, the RN is a transparent RN. In contrast, if the UE perceives whether it communicates with a network via an RN, the RN is a non-transparent RN.

In relation to control of RNs, RNs may be classified into an RN configured as a part of a donor cell and an RN that self-controls a cell.

The former RN may have an RN ID, although it does not have its own cell ID. If at least a part of Radio Resource Management (RRM) of an RN is controlled by an eNB covering the donor cell, the RN is regarded as configured as a part of the donor cell (even though the other parts of the RRM reside in the RN). Preferably, this RN can support legacy UEs (e.g. LTE UEs). For instance, smart repeaters, decode-and-forward relays, various types of L2 RNs, and type-2 RNs form a part of a donor cell.

The latter RN controls one or more cells. The cells are allocated their unique physical cell IDs and they may use the same RRM mechanism. From the viewpoint of a UE, there is no distinction between accessing a cell controlled by an RN and accessing a cell controlled by a Macro eNB (MeNB). Preferably, a cell controlled by this type of RN may support legacy UEs. For example, RNs of this type include self-backhauling RNs, L3 RNs, type-1 RNs, and type-1a RNs.

A type-1 RN is an in-band RN that controls a plurality of cells. Each of the plurality of cells appears to a UE as a separate cell distinct from a donor cell. The plurality of cells have their own physical cell IDs (as defined in LTE Release-8) and the RN can transmit its own synchronization channels, RSs, etc. During a single-cell operation, a UE may receive scheduling information and an HARQ feedback directly from the RN and transmit its control channels (a Scheduling Request (SR), a CQI, an ACK/NACK, etc.) to the RN. The type-1 RN appears as a legacy eNB (operating in conformance to LTE Release-8) to a legacy UE (conforming to LTE Release-8). That is, the type-1 RN has backward compatibility. On the other hand, to LTE-A UEs, the type-1 RN appears different from a legacy eNB. Thus the type-1 RN can enhance performance.

Except for its out-band operation, a type-1a RN is characterized by the same set of features as the type-1 RN. The type-1a RN may be configured such that the influence of its operation on an L1 operation is minimized or eliminated.

A type-2 RN is an in-band RN that does not have its own physical cell ID and thus does not form a new cell. Since the type-2 RN is transparent to legacy UEs, the legacy UEs do not notice the existence of the type-2 RN. The type-2 RN can transmit a PDCCH but does not transmit at least a Common RS (CRS) and a PDCCH.

In order to allow in-band relaying, some resources in the time-frequency domain should be set aside for a backhaul link and these resources may be set not to be used for an access link. This is called resource partitioning.

A description will be given of the general principle of resource partitioning for an RN. A backhaul DL and an access DL may be TDM-multiplexed in one carrier frequency (that is, only one of the backhaul DL and the access DL is activated at a specific time). Similarly, a backhaul UL and an access UL may be TDM-multiplexed in one carrier frequency (that is, only one of the backhaul UL and the access UL is activated at a specific time).

Multiplexing of backhaul links in FDD is performed such that backhaul DL transmission and backhaul UL transmission take place in a DL frequency band and a UL frequency band, respectively. In comparison, multiplexing of backhaul links in TDD is performed such that backhaul DL transmission and backhaul UL transmission take place in a DL subframe between an eNB and an RN and a UL subframe between the eNB and the RN, respectively.

In the case of an in-band RN, for example, if backhaul DL reception from an eNB and access DL transmission to a UE are performed simultaneously in the same frequency band, a signal transmitted from the transmitter of the RN may be received at the receiver of the RN. As a result, signal interference or Radio Frequency (RF) jamming may occur at the RF front-end of the RN. Likewise, if access UL reception from a UE and backhaul UL transmission to an eNB take place simultaneously in the same frequency band, the RF front-end of the RN may experience signal interference. Therefore, simultaneous eNB-to-RN and RN-to-UE transmissions in the same frequency band may not be feasible unless a reception signal and a transmission signal are sufficiently isolated from each other (e.g. a Transmission (Tx) antenna is geographically apart enough from a Reception (Rx) antenna (e.g. installed on the ground/underground)).

One way to handle the signal interference is to operate the RN such that while the RN is receiving a signal from a donor cell, it is not transmitting signals to UEs. That is, a gap is created in the RN-to-UE transmission and UEs (including legacy UEs) are not supposed to expect any RN transmission during the gap. This gap may be created by configuring a Multicast Broadcast Single Frequency Network (MBSFN) subframe.

Figure 16:
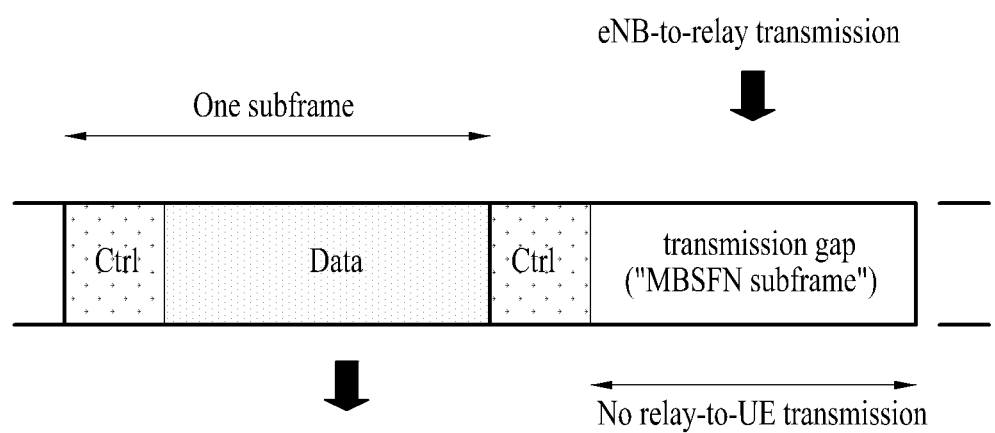
FIG. 16 illustrates exemplary resource partitioning for a Relay Node (RN)

FIG. 16 illustrates an example of resource partitioning for an RN.

In FIG. 16, a first subframe is a general subframe in which an RN transmits a DL (i.e. an access DL) control signal and data to a UE and a second subframe is an MBSFN subframe in which the RN transmits a control signal to a UE in the control region of a DL subframe but no transmission occurs from the RN to a UE in the other region of the DL subframe. Since a legacy UE expects PDCCH transmission in every DL subframe (in other words, the RN needs to allow legacy UEs within its area to receive a PDCCH in each subframe and thus support a measurement function), it is necessary to transmit a PDCCH in every DL subframe to ensure reliable operations of legacy UEs. Therefore, the RN needs access downlink transmission in the first N (N=1, 2 or 3) OFDM symbols of even a subframe (a second subframe 1020) configured for DL (i.e. backhaul DL) transmission from an eNB to the RN, instead of backhaul DL reception. Since the RN transmits a PDCCH to UEs in the control region of the second subframe, backward compatibility may be provided to legacy UEs served by the RN. The RN may receive a signal from the eNB in the remaining region of the second subframe in which no transmission occurs from the RN to UEs. Thus, an in-band RN does not perform access DL transmission and backhaul DL reception simultaneously by the above-described resource partitioning.

The second subframe using an MBSFN subframe will be described in detail. The control region of the second subframe may be referred to as an RN non-hearing period. An RN transmits an access DL signal without receiving a backhaul DL signal in the RN non-hearing period. The RN non-hearing period may have 1, 2 or 3 OFDM symbols. The RN may transmit an access DL signal to a UE in the RN non-hearing period and receive a backhaul DL signal from an eNB in the other period. Since the RN cannot perform transmission and reception simultaneously in the same frequency band, time is taken for the RN to switch from Tx mode to Rx mode. Therefore, a Guard Time (GT) needs to be set in a starting part of the backhaul DL reception area, for Tx/Rx mode switching of the RN. Similarly, when the RN receives a backhaul DL signal from the eNB and transmits an access DL signal to a UE, a GT may be set for Rx/Tx mode switching of the RN. The length of a GT may be a time-domain value, for example, k (k≥1) time samples ($T_s$) or one or more OFDM symbols. Or when RN backhaul DL subframes are successively configured or according to a predetermined subframe timing alignment relationship, a GT may not be defined or set at the end of a subframe. To maintain backward compatibility, a GT may be defined only in a frequency area set for backhaul DL subframe transmission (if a GT is set in an access DL period, legacy UEs cannot be supported). The RN may receive a PDCCH and a PDSCH from the eNB in the backhaul DL reception period except for the GT. The PDCCH and PDSCH may be called an R-PDCCH (or relay-PDCCH) and an R-PDSCH (or relay-PDSCH) to indicate that they are RN dedicated physical channels.

The present invention provides a method for efficiently transmitting UCI such as a CQI, an RI, an ACK/NACK, and an SR on a PUCCH according to a UL subframe transmission/reception timing between backhaul links or access links in an environment where a macro eNB (MeNB) coexists with an RN.

Before describing the present invention, UL subframe transmission/reception timings between backhaul links or access links will be described briefly. While the following description is given in the context of the LTE system for the convenience of description, those skilled in the art will readily understand that the present invention is applicable to UL subframe transmission/reception timings other than the UL subframe transmission/reception timings described below. Particularly, it is assumed that subframe indexes and symbol indexes start with 0.

According to a first UL subframe transmission/reception timing, an RN starts backhaul UL transmission in SC-FDMA symbol m and discontinues the backhaul UL transmission in SC-FDMA symbol n.

According to a second UL subframe transmission/reception timing, an RN performs backhaul UL transmission in SC-FDMA symbol 0 through the last SC-FDMA symbol. In the case of a normal CP, the index of the last SC-FDMA symbol is 13. The second UL subframe transmission/reception timing is set for the case where a backhaul link and an access link are misaligned by a predetermined gap and the Tx/Rx switching time of the RN is determined according to a Guard Period (GP) or puncturing of the last SC-FDMA symbol of an access link.

According to a third UL subframe transmission/reception timing, an RN performs backhaul UL transmission in SC-FDMA symbol #0 through SC-FDMA symbol #12 or #13. Index 12 or 13 is determined based on a propagation delay between an MeNB and the RN and the Tx/Rx switching time of the RN. Particularly, the third UL subframe transmission/reception timing is set for the case where a backhaul UL reception timing of the MeNB matches with an access UL reception timing of the RN and the Tx/Rx switching time of the RN is determined according to puncturing of the last SC-FDMA symbol of an access link or a backhaul link.

According to a fourth UL subframe transmission/reception timing, an RN performs backhaul UL transmission in SC-FDMA symbol #0 through SC-FDMA symbol #12 (in the case of a normal CP). This timing considers a case where an access UL subframe and a backhaul UL subframe are misaligned by a fixed gap.

Figure 17:
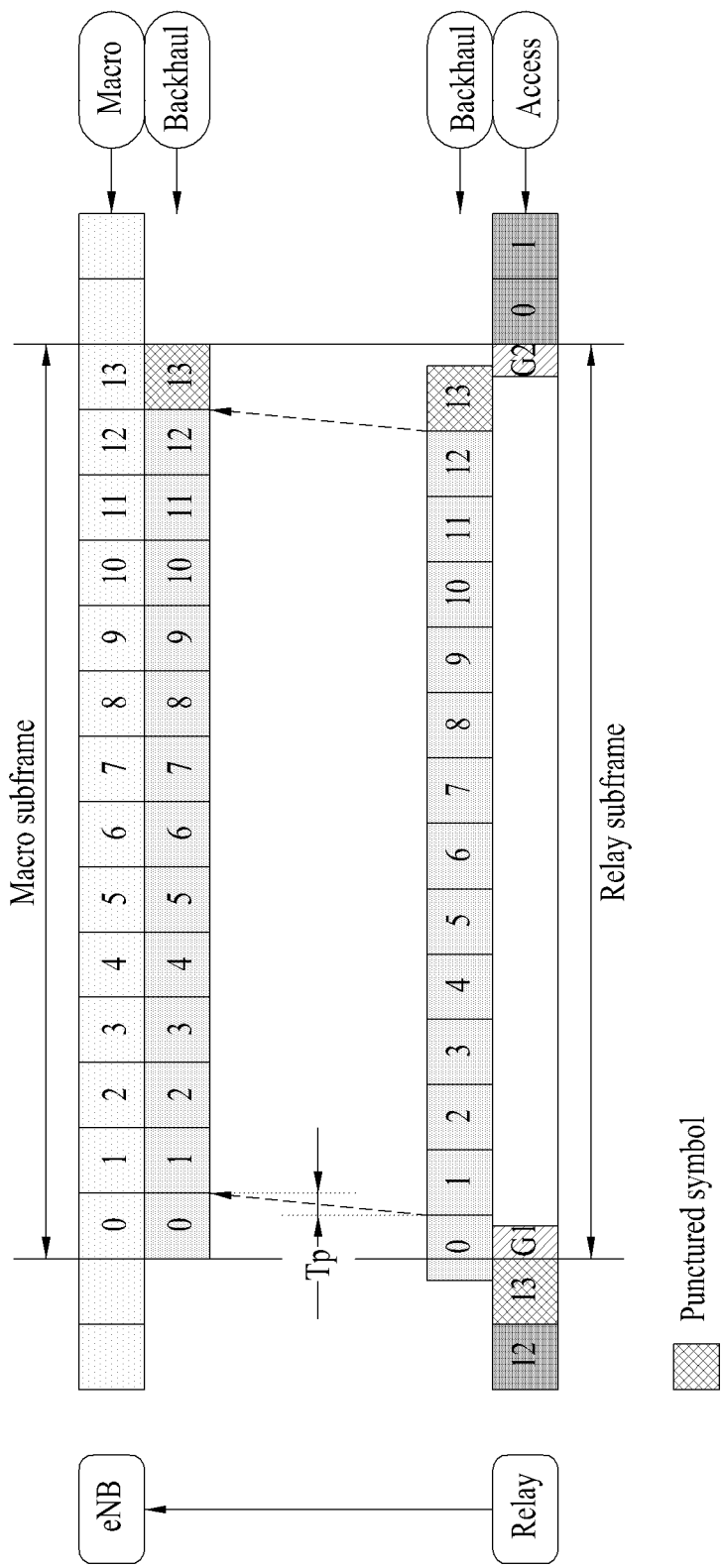
FIG. 17 illustrates an exemplary uplink subframe transmission/reception timing.

FIG. 17 illustrates an exemplary UL subframe transmission/reception timing. Particularly, FIG. 17 illustrates the third UL subframe transmission/reception timing in the case of a normal CP. In FIG. 17, reference character Tp represents a propagation delay and reference characters G1 and G2 represent GPs.

Referring to FIG. 17, the last symbol of a backhaul UL subframe, i.e. symbol #13 and the last symbol of an access UL subframe, i.e. symbol #13 are punctured. In particular, the last symbol of the backhaul UL subframe is punctured in view of the Tx/Rx switching time G2 of the RN.

If the starting transmission time of the access UL subframe is advanced by Tp (i.e. a timing advance is applied) to align the backhaul UL reception timing of the MeNB with the access UL reception timing of the RN, the last symbol of the access UL subframe overlaps with symbol #0 of the backhaul UL subframe and the Rx/Tx switching time G1 is required for the RN. Therefore, the last symbol of the access UL subframe is punctured.

If the cell coverage of the MeNB is extended relative to the cell coverage of an existing eNB and a mobile relay is used as the RN, the maximum value of the propagation delay Tp may be increased, thereby making it impossible for the M-RN to transmit the first and second symbols of the backhaul UL subframe, i.e. symbols #0 and #1.

Figure 18:
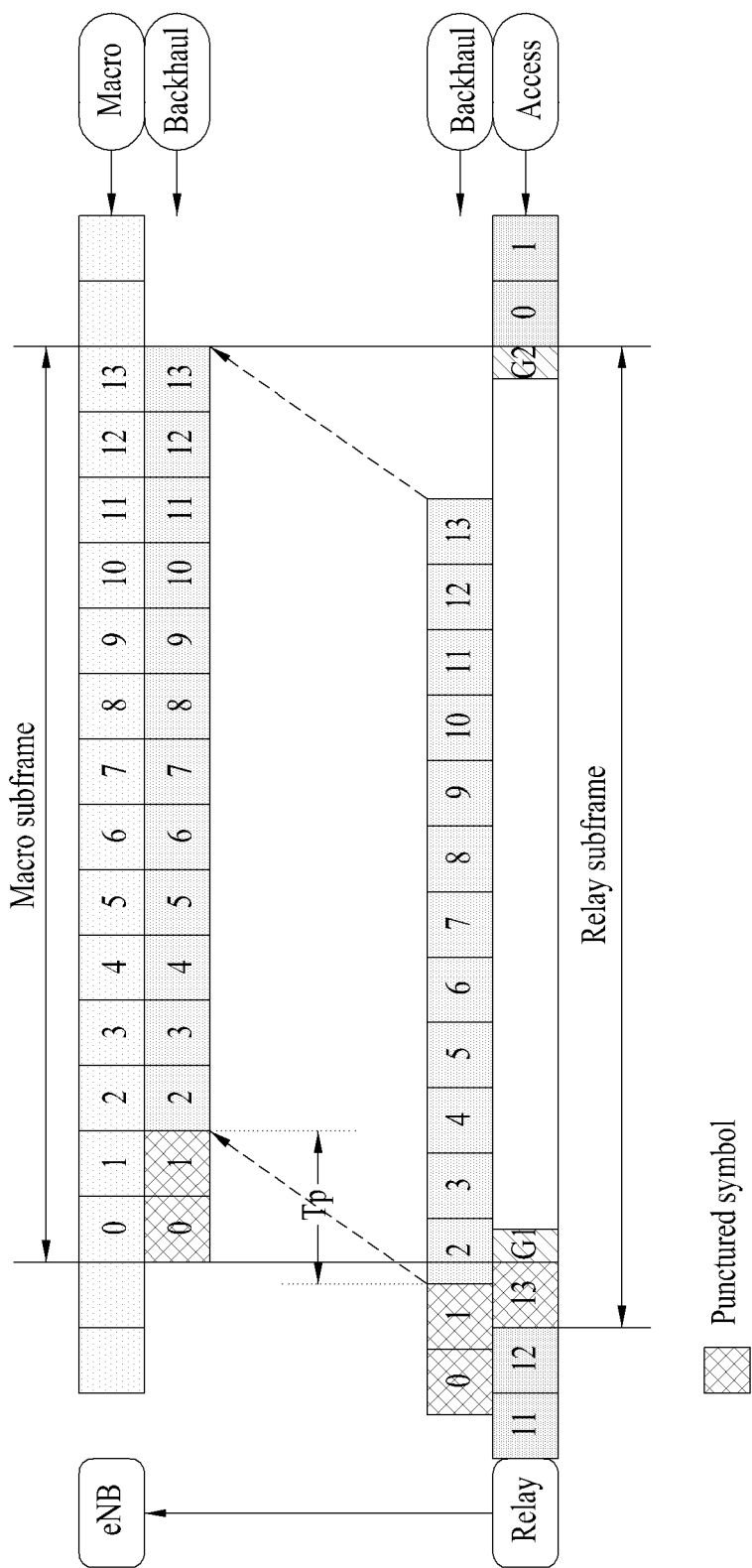
FIG. 18 illustrates another exemplary uplink subframe transmission/reception timing.

FIG. 18 is another view illustrating a UL subframe transmission/reception timing in the above case. Like FIG. 17, FIG. 18 illustrates the third UL subframe timing in the case of a normal CP.

Referring to FIG. 18, the first and second symbols of the backhaul UL subframe are punctured. That is, to align the UL subframe reception timing of the MeNB with the UL subframe reception timing of the RN, the starting transmission time of the backhaul UL subframe is advanced by Tp (i.e. a timing advance is applied). The first and second symbols of the backhaul UL subframe overlap with symbols #11 and #12 of the access UL subframe and thus are punctured.

Further, the last symbol with index 13 of the access UL subframe overlaps with symbol #2 of the backhaul UL subframe due to the timing advance Tp and is punctured due to the Rx/Tx switching time G1 of the RN.

Puncturing of the first and second symbols of a backhaul UL subframe as illustrated in FIG. 18 may lead to degradation of the reception decoding performance of control information (e.g. a CQI, an RI, an ACK/NACK, an SR, etc.) transmitted on a PUCCH by an RN. Especially, a DM-RS is not transmitted on a PUCCH or orthogonality is not maintained in a time-domain code multiplexing scheme used for the PUCCH, that is, a scheme of multiplexing control information using orthogonal sequences, due to puncturing of the first two symbols of the backhaul UL subframe.

Figure 19:
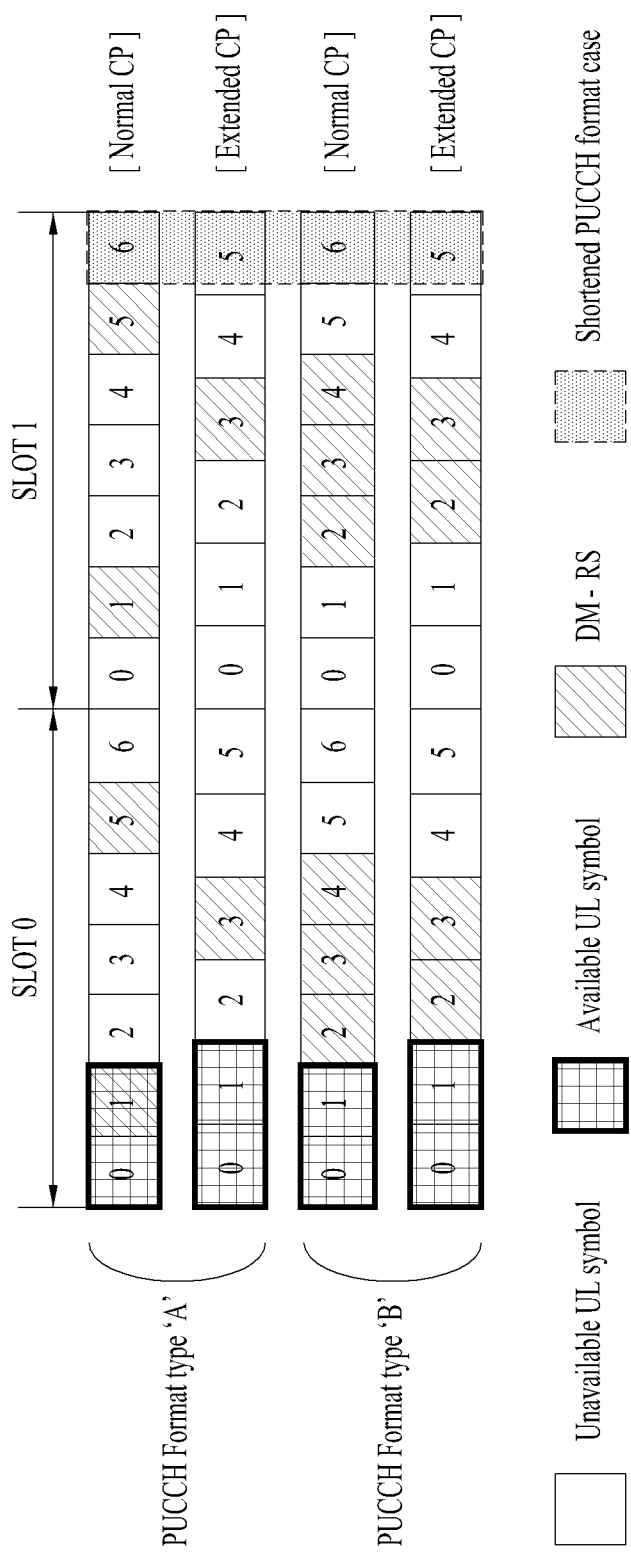
FIG. 19 illustrates PUCCH format structures available for transmission of uplink control information.

FIG. 19 illustrates PUCCH format structures available for UCI transmission. Particularly, FIG. 19 describes a problem that may occur due to puncturing of the first two symbols of a backhaul UL subframe.

In FIG. 19, an available UL symbol is a UL symbol carrying the payload of UCI on a PUCCH. For example, available UL symbols refer to the remaining UL symbols except for UL symbols punctured according to a preset UL subframe timing (the third UL subframe timing in FIG. 19) and UL symbols used for DM-RS transmission on a PUCCH. However, if a shortened PUCCH format is used, a symbol (last symbol) unused in the second slot may also be excluded from the available UL symbols. Among the 3GPP LTE PUCCH formats, PUCCH format 1/1a/1b and PUCCH format 3 support shortened PUCCH formats. However, the present invention can be extended to a shortened PUCCH format of PUCCH format 2/2a/2b.

If CQI information is multiplexed with ACK/NACK information in an exceptional case (e.g. in PUCCH format 2a/2b in the 3GPP LTE system), the ACK/NACK information may be mapped even to the second PUCCH DM-RS symbol of each slot. In this case, the second PUCCH DM-RS symbol of each slot may be added as an available UL symbol.

In the present invention, PUCCH format type B for normal and extended CPs applies to 3GPP LTE PUCCH format 1/1a/1b, PUCCH format type A for normal and extended CPs applies to 3GPP LTE PUCCH format 2/3, and PUCCH format type A for a normal CP applies to 3GPP LTE PUCCH format 2a/2b.

In addition, if the first two of UL symbols are punctured, UL symbol indexes to which the payload of UCI are mapped may be determined in the following two methods.

In one of the methods, if the first UL symbol of the remaining symbols except the punctured first two UL symbols is determined to be the starting index of UL symbols to which the payload of UCI is mapped, the payload of UCI transmitted in the last two UL symbols is not transmitted.

In the other method, if the first of UL symbols including the punctured first two UL symbols is determined to be the starting index of UL symbols to which the payload of UCI is mapped, the payload of the UCI transmitted in the first two UL symbols is not transmitted.

The proposed methods of the present invention cover operations in the above two cases. Further, the above-described two methods can be performed even when the first of UL symbols is punctured. The proposed methods cover all such cases. In addition, the proposed methods can be extended to the case where the last one or two of UL symbols are punctured.

With continued reference to FIG. 19, in PUCCH format type A for a normal CP, the first two symbols of a backhaul UL subframe are punctured and thus a PUCCH DM-RS transmitted in UL symbol #1 may not be transmitted.

If UCI or PUCCH DM-RSs of a plurality of RNs are code-multiplexed in the time domain using orthogonal sequences, that is, a plurality of RN PUCCHs are multiplexed, in PUCCH format type A or PUCCH format type B, puncturing of the first two symbols of a backhaul UL subframe may breach orthogonality which was maintained with existing orthogonal sequences among the multiplexed RN PUCCHs.

More specifically, let an orthogonal sequence of length N (i.e. an orthogonal sequence with SF=N) be denoted by $[w_0\ w_1, \ldots w_{N-2}\ w_{N-1}]$. The elements of the orthogonal sequence $w_0, w_1, \ldots, w_{N-2}, w_{N-1}$ are sequentially multiplied at the positions of available UL symbols (or PUCCH DM-RS symbols).

For example, if an orthogonal sequence with an SF of 4 $[w_0\ w_1\ w_2\ w_3]$ (for available UL symbols) is used for the first slot in PUCCH format type B for a normal CP case, the elements of the orthogonal sequence, $w_C, w_1, w_2,$ and $w_3$ are multiplied respectively at the positions of UL symbols #0, #1, #5, and #6. If the first two symbols of the backhaul UL subframe are punctured in the same situation, non-transmission of UL symbols #0 and #1 (i.e. $w_C$ and $w_3$) breaches orthogonality among a plurality of RN PUCCHs, which might otherwise be maintained in the time domain with the orthogonal sequence $[w_0\ w_1\ w_2\ w_3]$.

Accordingly, in the case where the first and second symbols of a backhaul UL subframe are not available as illustrated in FIG. 18, the present invention provides a modified PUCCH format structure to efficiently transmit control information (e.g. a CQI, an RI, an ACK/NACK, an SR, etc.) on a PUCCH and a method for allocating an orthogonal sequence according to the modified PUCCH format structure.

[Table 4] to [Table 10] below list orthogonal sequences with SF=1 to 5 for application to available UL symbols and PUCCH DM-RSs. Specifically, [Table 9] lists orthogonal sequences with SF=1 and [Table 4] and [Table 10] list orthogonal sequences with SF=2. [Table 5] lists orthogonal sequences with SF=3, [Table 6] and [Table 7] list orthogonal sequences with SF=4, and [Table 8] lists orthogonal sequences with SF=5.

TABLE 4

| Sequence index | Orthogonal sequence |
|---|---|
| 1-0 | [+1 +1] |
| 1-1 | [+1 −1] |

TABLE 5

| Sequence index | Orthogonal sequence |
|---|---|
| 2-0 | [1 1 1] |
| 2-1 | $[1\ e^{j2\pi/3}\ e^{j4\pi/3}]$ |
| 2-2 | $[1\ e^{j4\pi/3}\ e^{j2\pi/3}]$ |

TABLE 6

| Sequence index | Orthogonal sequence |
|---|---|
| 3-0 | [+1 +1 +1 +1] |
| 3-1 | [+1 −1 +1 −1] |
| 3-2 | [+1 −1 −1 +1] |

TABLE 7

| Sequence index | Orthogonal sequence |
|---|---|
| 4-0 | [+1 +1 +1 +1] |
| 4-1 | [+1 −1 +1 −1] |
| 4-2 | [+1 −1 −1 +1] |
| 4-3 | [+1 +1 −1 −1] |

TABLE 8

| Sequence index | Orthogonal sequence |
|---|---|
| 5-0 | [1 1 1 1 1] |
| 5-1 | $[1\ e^{j2\pi/5}\ e^{j4\pi/5}\ e^{j6\pi/5}\ e^{j8\pi/5}]$ |
| 5-2 | $[1\ e^{j4\pi/5}\ e^{j8\pi/5}\ e^{j2\pi/5}\ e^{j6\pi/5}]$ |
| 5-3 | $[1\ e^{j6\pi/5}\ e^{j2\pi/5}\ e^{j8\pi/5}\ e^{j4\pi/5}]$ |
| 5-4 | $[1\ e^{j8\pi/5}\ e^{j6\pi/5}\ e^{j4\pi/5}\ e^{j2\pi/5}]$ |

TABLE 9

| Sequence index | Orthogonal sequence |
|---|---|
| 6-0 | [1] |

TABLE 10

| Sequence index | Orthogonal sequence |
|---|---|
| 7-0 | [1 1] |

It is assumed herein that the elements of an orthogonal sequence are multiplied sequentially at the positions of available UL symbols (or PUCCH DM-RS symbols).

Shaded parts of the following tables illustrating the orthogonal sequence allocation method of the present invention indicate situations where only a part of total orthogonal sequences listed in [Table 4] to [Table 10] should be selected. Here, <i→j> means that j orthogonal sequences are selected from among total i orthogonal sequence candidates. For example, a set of j orthogonal sequences that minimize inter-code interference under the condition of a high Doppler effect may be selected. For example, if two orthogonal sequences are to be selected from [Table 7] (or [Table 6]) listing four (or three) orthogonal sequence candidates in total, sequence indexes #4-0 and #4-2 (or sequence indexes #3-0 and #3-2) may be selected.

In another method, it may be regulated preliminarily as an exception that <i→1> indicates selection of the first of total i orthogonal sequences listed in a table. For example, if one orthogonal sequence is to be selected from [Table 5] listing three orthogonal sequence candidates in total, sequence index #2-0 may be selected. In addition, in the case of <i→1>, it may be regulated preliminarily that a predetermined $n^{th}$ orthogonal sequence of total i orthogonal sequences listed in a table is selected.

The present invention does not exclude selection of a set of orthogonal sequence candidates other than the above-described sets of orthogonal sequence candidates. In the following tables illustrating the orthogonal sequence allocation method of the present invention, "[ ]" means an orthogonal sequence applied (or selected) when a shortened PUCCH format is configured.

Embodiment 1

Figure 20:
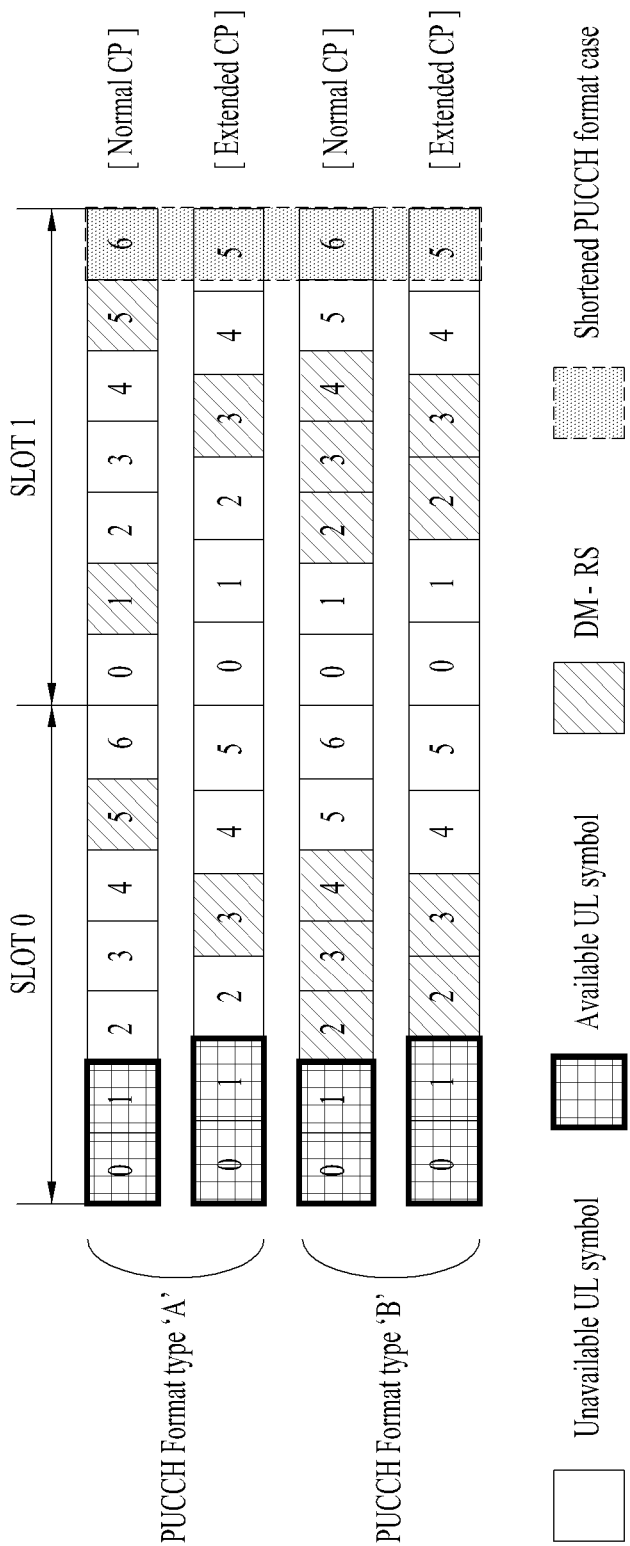
FIG. 20 illustrates a PUCCH format structure according to an embodiment of the present invention.

FIG. 20 illustrates a PUCCH format structure according to an embodiment of the present invention. Particularly, FIG. 20 illustrates a PUCCH format structure in the case where the first and second symbols of a backhaul UL subframe are punctured, according to an embodiment of the present invention. In this embodiment of the present invention, PUCCH DM-RSs residing in the (punctured) first two symbols of a backhaul UL subframe illustrated in FIG. 19 are omitted. An orthogonal sequence allocation method according to the embodiment of the present invention is illustrated in [Table 11].

TABLE 11

| 1-a | PUCCH format type B |
|---|---|
| Normal CP (available UL symbols) | First slot: Table 4<br>Second slot: Table 6 [Table 5] |
| Extended CP (available UL symbols) | First slot: Table 4<br>Second slot: Table 6 <3→2><br>(or Table 7 <4→2>) [Table 5 <3→2>] |
| Normal CP (PUCCH DM-RSs) | First slot: Table 5 <3→2><br>Second slot: Table 5 |
| Extended CP (PUCCH DM-RSs) | First slot: Table 4<br>Second slot: Table 4 |

| 1-b | PUCCH format type A |
|---|---|
| Normal CP (available UL symbols) | First slot: Table 7<br>Second slot: Table 8 [Table 7] |

TABLE 11-continued

| Extended CP (available UL symbols) | First slot: Table 5<br>Second slot: Table 8 [Table 7] |
|---|---|
| Normal CP (PUCCH DM-RSs) | First slot: Table 9<br>Second slot: Table 10 |
| Extended CP (PUCCH DM-RSs) | First slot: Table 9<br>Second slot: Table 9 |

If the first and second symbols of a backhaul UL subframe are punctured, PUCCH format type A and orthogonal sequence 1-b according to the embodiment of the present invention may be used as a PUCCH format modified from (3GPP LTE-based) PUCCH format 3 (e.g. modified PUCCH format 3).

If the first and second symbols of a backhaul UL subframe are punctured, PUCCH format type B and orthogonal sequence 1-a according to the embodiment of the present invention may be used as a PUCCH format modified from (3GPP LTE-based) PUCCH format 1/1a/1b (e.g. modified PUCCH format 1/1a/1b).

Embodiment 2

Figure 21:
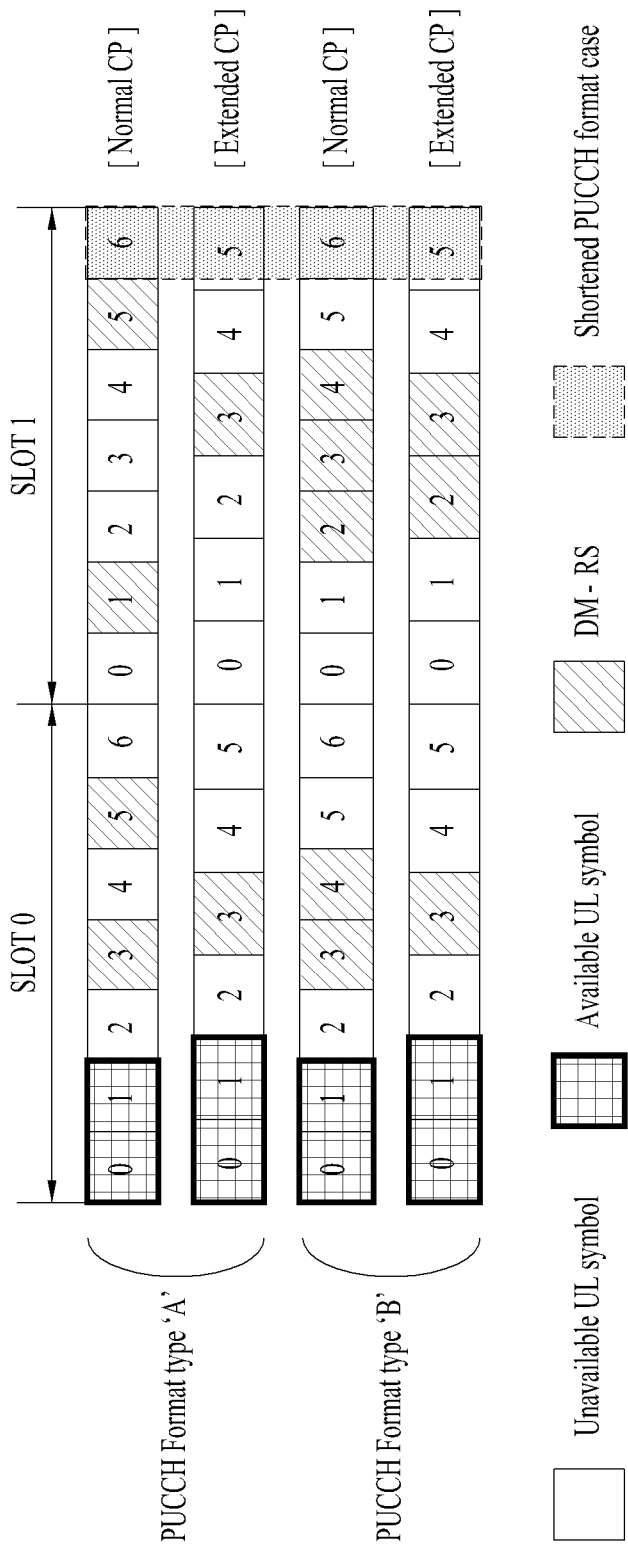
FIG. 21 illustrates a PUCCH format structure according to another embodiment of the present invention.

FIG. 21 illustrates a PUCCH format structure according to another embodiment of the present invention. Like FIG. 20, FIG. 21 illustrates a PUCCH format structure in the case where the first and second symbols of a backhaul UL subframe are punctured. In FIG. 21, PUCCH DM-RSs are distributed as uniformly as possible to the remaining area of the first slot (i.e. UL symbols #2 to #6 in the case of a normal CP and UL symbols #2 to #5 in the case of an extended CP) except for the punctured first two symbols of the first slot of a backhaul UL subframe. An orthogonal sequence allocation method according to this embodiment of the present invention is illustrated in [Table 12].

TABLE 12

| 2-a | PUCCH format type B |
|---|---|
| Normal CP (available UL symbols) | First slot: Table 5 <3→2><br>Second slot: Table 6 [Table 5] |
| Extended CP (available UL symbols) | First slot: Table 5 <3→1><br>Second slot: Table 6 <3→2><br>(or Table 7 <4→2>) [Table 5 <3→2>] |
| Normal CP (PUCCH DM-RSs) | First slot: Table 4<br>Second slot: Table 5 |
| Extended CP (PUCCH DM-RSs) | First slot: Table 9<br>Second slot: Table 4 |

| 2-b | PUCCH format type A |
|---|---|
| Normal CP (available UL symbols) | First slot: Table 5<br>Second slot: Table 8 [Table 7] |
| Extended CP (available UL symbols) | First slot: Table 5<br>Second slot: Table 8 [Table 7] |
| Normal CP (PUCCH DM-RSs) | First slot: Table 10<br>Second slot: Table 10 |
| Extended CP (PUCCH DM-RSs) | First slot: Table 9<br>Second slot: Table 9 |

If the first and second symbols of a backhaul UL subframe are punctured, PUCCH format type B and orthogonal sequence 2-b according to the second embodiment of the present invention may be used as a PUCCH format modified from (3GPP LTE-based) PUCCH format 3 (e.g. modified PUCCH format 3).

If the first and second symbols of a backhaul UL subframe are punctured, PUCCH format type B and orthogonal sequence 2-a according to the second embodiment of the present invention may be used as a PUCCH format modified from (3GPP LTE-based) PUCCH format 1/1a/1b (e.g. modified PUCCH format 1/1a/1b).

Embodiment 3

Figure 22:
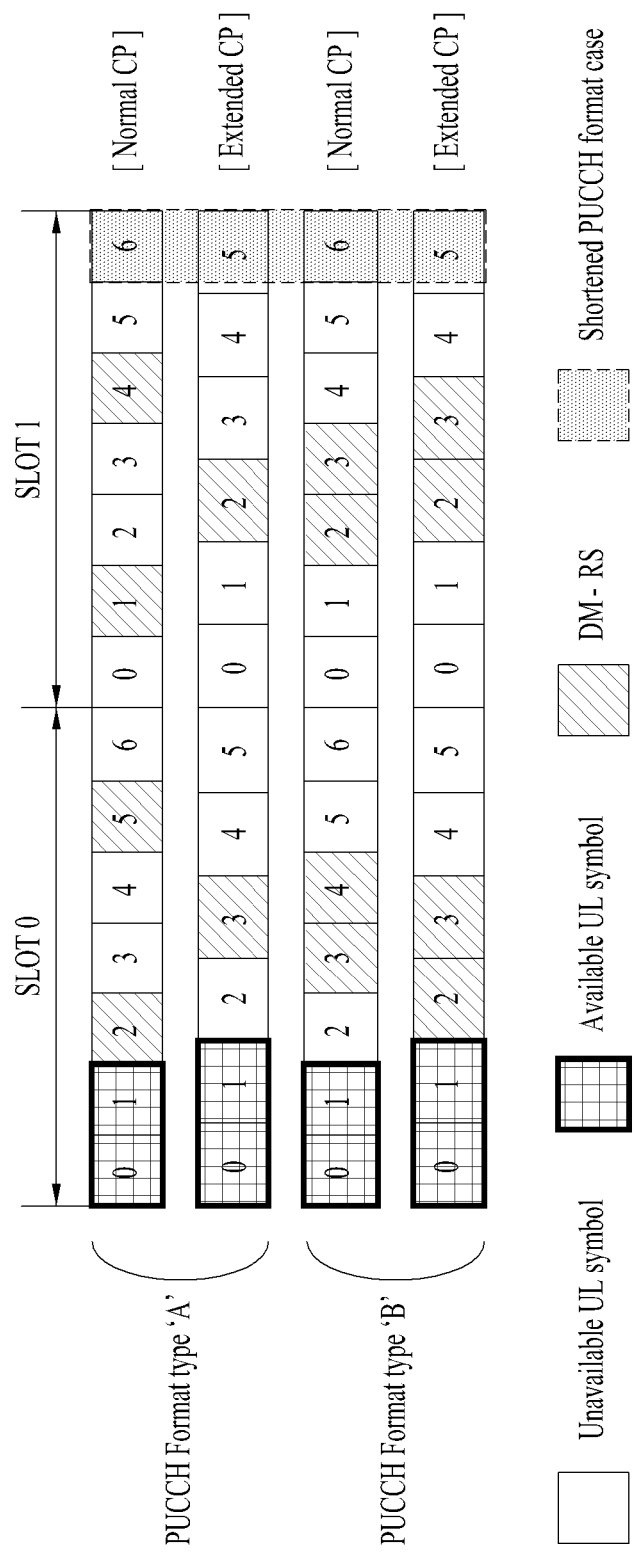
FIG. 22 illustrates a PUCCH format structure according to a third embodiment of the present invention.

FIG. 22 illustrates a PUCCH format structure according to a third embodiment of the present invention. FIG. 21 also illustrates a PUCCH format structure in the case where the first and second symbols of a backhaul UL subframe are punctured. In FIG. 22, the positions of PUCCH DM-RSs are symmetrical between the first and second slots of a backhaul UL subframe in the remaining area of the first slot (i.e. UL symbols #2 to #6 in the case of a normal CP and UL symbols #2 to #5 in the case of an extended CP) except for the punctured first two symbols of the first slot of the backhaul UL subframe. An orthogonal sequence allocation method according to the third embodiment of the present invention is illustrated in [Table 13].

TABLE 13

| 3-a | PUCCH format type B |
|---|---|
| Normal CP (available UL symbols) | First slot: Table 5 <3→2> Second slot: Table 8 <5→2> [Table 6 <3→2> (or Table 7 <4→2>)] |
| Extended CP (available UL symbols) | First slot: Table 4 Second slot: Table 6 <3→2> (or Table 7 <4→2>) [Table 5 <3→2>] |
| Normal CP (PUCCH DM-RSs) | First slot: Table 4 Second slot: Table 4 |
| Extended CP (PUCCH DM-RSs) | First slot: Table 4 Second slot: Table 4 |

| 3-b | PUCCH format type A |
|---|---|
| Normal CP (available UL symbols) | First slot: Table 5 Second slot: Table 8 [Table 7] |
| Extended CP (available UL symbols) | First slot: Table 5 Second slot: Table 8 [Table 7] |
| Normal CP (PUCCH DM-RSs) | First slot: Table 10 Second slot: Table 10 |
| Extended CP (PUCCH DM-RSs) | First slot: Table 9 Second slot: Table 9 |

If the first and second symbols of a backhaul UL subframe are punctured, PUCCH format type A and orthogonal sequence 3-b according to the third embodiment of the present invention may be used as a PUCCH format modified from (3GPP LTE-based) PUCCH format 3 (e.g. modified PUCCH format 3).

If the first and second symbols of a backhaul UL subframe are punctured, PUCCH format type B and orthogonal sequence 3-a according to the third embodiment of the present invention may be used as a PUCCH format modified from (3GPP LTE-based) PUCCH format 1/1a/1b (e.g. modified PUCCH format 1/1a/1b).

Embodiment 4

Figure 23:
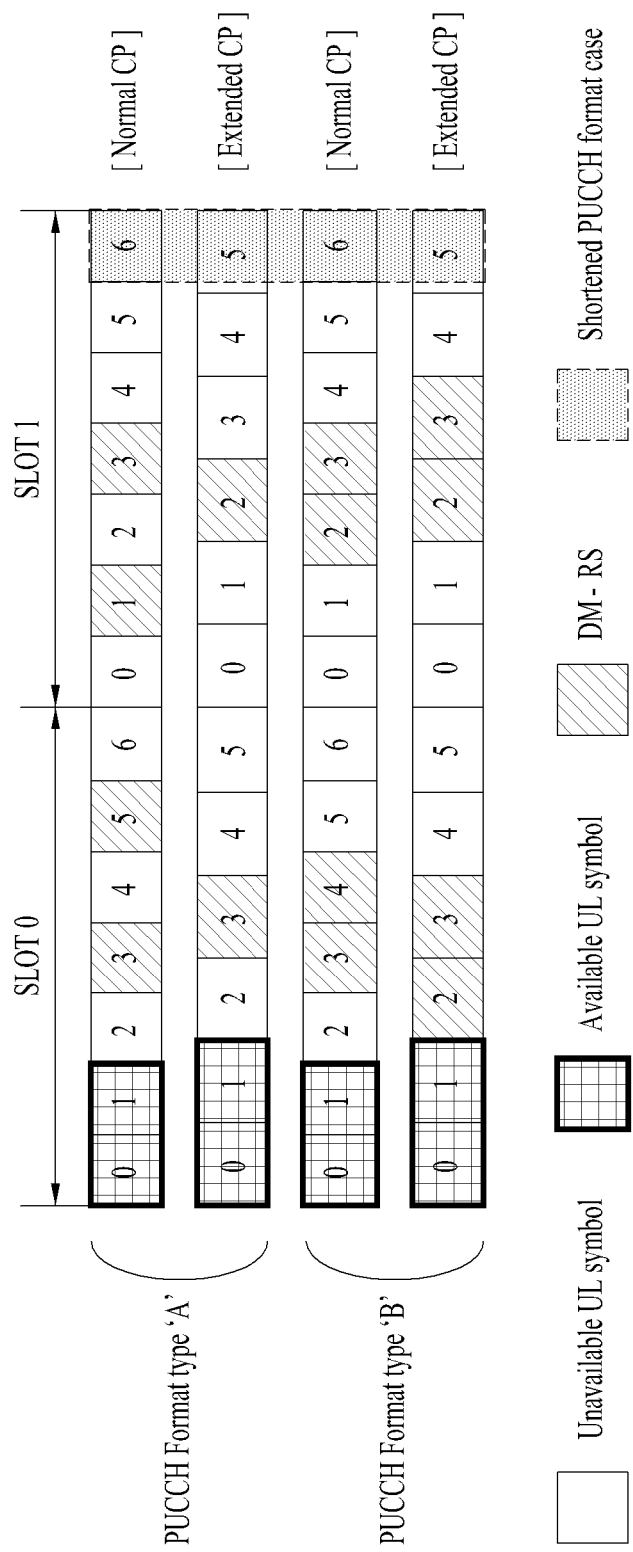
FIG. 23 illustrates a PUCCH format structure according to a fourth embodiment of the present invention.

FIG. 23 illustrates a PUCCH format structure according to a fourth embodiment of the present invention. FIG. 23 also illustrates a PUCCH format structure in the case where the first and second symbols of a backhaul UL subframe are punctured. In FIG. 23, the positions of PUCCH DM-RSs are symmetrical between the first and second slots of a backhaul UL subframe in the remaining area of the first slot (i.e. UL symbols #2 to #6 in the case of a normal CP and UL symbols #2 to #5 in the case of an extended CP) except for the punctured first two symbols of the first slot of the backhaul UL subframe. An orthogonal sequence allocation method according to the fourth embodiment of the present invention is illustrated in [Table 14].

TABLE 14

| 4-a | PUCCH format type B |
|---|---|
| Normal CP (available UL symbols) | First slot: Table 5 <3→2> Second slot: Table 8 <5→2> [Table 6 <3→2> (or Table 7 <4→2>) |
| Extended CP (available UL symbols) | First slot: Table 4 Second slot: Table 6 <3→2> (or Table 7 <4→2>) [Table 5 <3→2>] |
| Normal CP (PUCCH DM-RSs) | First slot: Table 4 Second slot: Table 4 |
| Extended CP (PUCCH DM-RSs) | First slot: Table 4 Second slot: Table 4 |

| 4-b | PUCCH format type A |
|---|---|
| Normal CP (available UL symbols) | First slot: Table 5 Second slot: Table 8 [Table 7] |
| Extended CP (available UL symbols) | First slot: Table 5 Second slot: Table 8 [Table 7] |
| Normal CP (PUCCH DM-RSs) | First slot: Table 10 Second slot: Table 10 |
| Extended CP (PUCCH DM-RSs) | First slot: Table 9 Second slot: Table 9 |

If the first and second symbols of a backhaul UL subframe are punctured, PUCCH format type A and orthogonal sequence 4-b according to the fourth embodiment of the present invention may be used as a PUCCH format modified from (3GPP LTE-based) PUCCH format 3 (e.g. modified PUCCH format 3).

If the first and second symbols of a backhaul UL subframe are punctured, PUCCH format type B and orthogonal sequence 4-a according to the fourth embodiment of the present invention may be used as a PUCCH modified from (3GPP LTE-based) PUCCH format 1/1a/1b format (e.g. modified PUCCH format 1/1a/1b).

Embodiment 5

Figure 24:
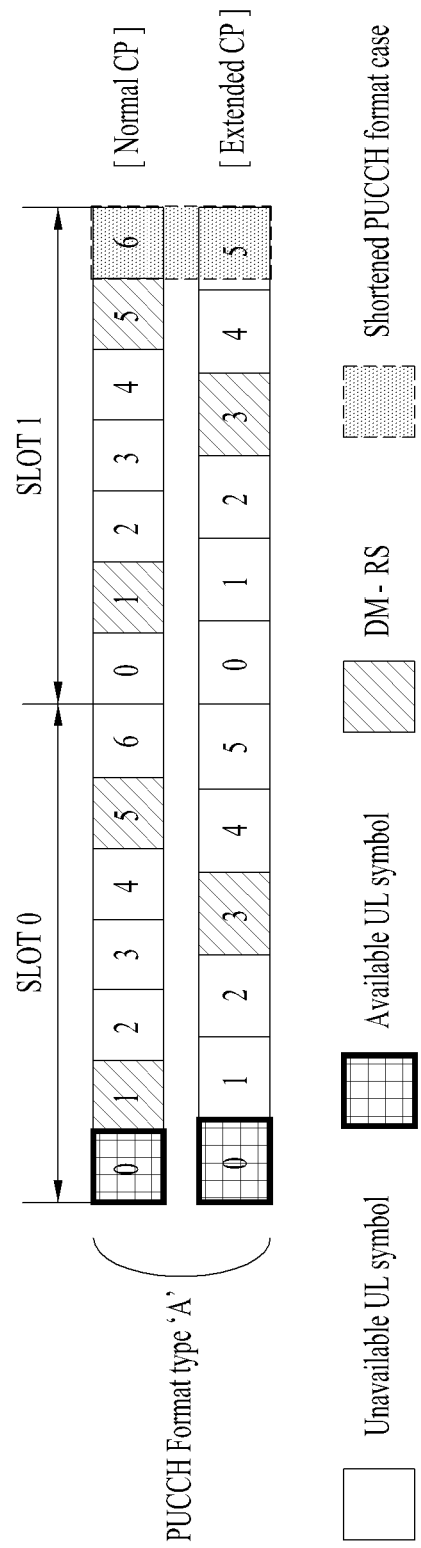
FIG. 24 illustrates a PUCCH format structure according to a fifth embodiment of the present invention.

FIG. 24 illustrates a PUCCH format structure according to a fifth embodiment of the present invention. An orthogonal sequence allocation method according to the fifth embodiment of the present invention is illustrated in [Table 15].

If the first symbol of a backhaul UL subframe is punctured, PUCCH format type A and orthogonal sequence 5-a according to the fifth embodiment of the present invention may be used as a PUCCH format modified from (3GPP LTE-based) PUCCH format 3 (e.g. modified PUCCH format 3).

TABLE 15

| 5-a | PUCCH format type A |
|---|---|
| Normal CP (available UL symbols) | First slot: Table 7 Second slot: Table 8 [Table 7] |
| Extended CP (available UL symbols) | First slot: Table 7 Second slot: Table 8 [Table 7] |
| Normal CP (PUCCH DM-RSs) | First slot: Table 10 Second slot: Table 10 |
| Extended CP (PUCCH DM-RSs) | First slot: Table 9 Second slot: Table 9 |

Embodiment 6

Figure 25:
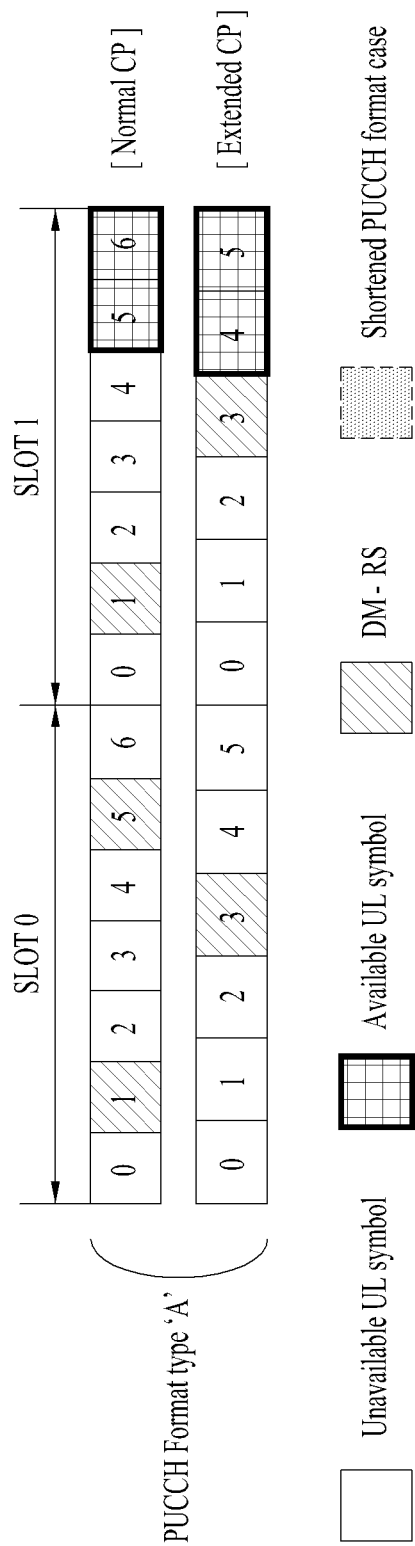
FIG. 25 illustrates a PUCCH format according to a sixth embodiment of the present invention.

FIG. 25 illustrates a PUCCH format structure according to a sixth embodiment of the preset invention. Particularly, FIG. 25 illustrates a case where the last two symbols of a backhaul UL subframe are punctured.

Referring to FIG. 25, an orthogonal sequence allocation method corresponding to PUCCH format type A according to any of the first to fourth embodiments of the present invention, for example, any of orthogonal sequence 1-b of [Table 11], orthogonal sequence 2-b of [Table 12], orthogonal sequence 3-b of [Table 13], and orthogonal sequence 4-b of [Table 14] (i.e. a shortened PUCCH format is not applied) is used to be bilaterally symmetrical, as a PUCCH format structure and an orthogonal sequence allocation method according to the sixth embodiment of the present invention.

Herein, bilateral symmetry means symmetrical mapping with respect to a slot boundary. For example, UL symbols #0 to #6 of the first slot are mapped respectively to UL symbols #6 to #0 of the second slot, and UL symbols #0 to #6 of the second slot are mapped respectively to UL symbols #6 to #0 of the first slot.

Figure 26:
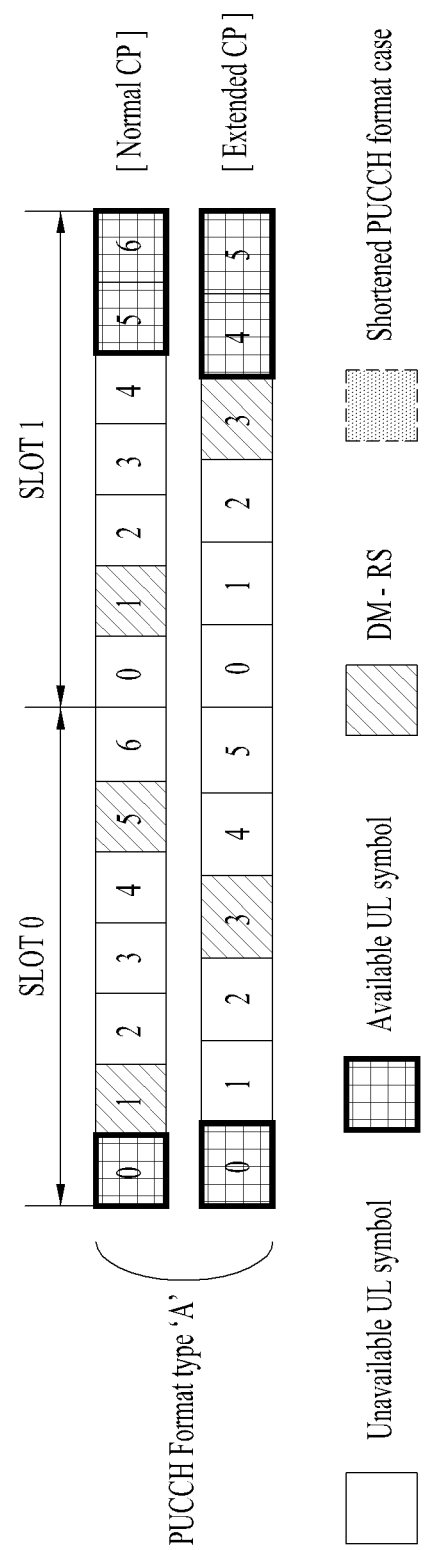
FIG. 26 illustrates another PUCCH format structure according to the sixth embodiment of the present invention.

FIG. 26 illustrates another PUCCH format structure according to the sixth embodiment of the present invention. Particularly in FIG. 26, the first symbol and the last two symbols of a backhaul UL subframe are punctured.

Referring to FIG. 26, PUCCH format type A and an orthogonal sequence allocation method according to any of the first to fourth embodiments of the present invention, for example, any of orthogonal sequence 1-b of [Table 11], orthogonal sequence 2-b of [Table 12], orthogonal sequence 3-b of [Table 13], and orthogonal sequence 4-b of [Table 14] (i.e. a shortened PUCCH format is not applied) is used to be bilaterally symmetrical, in the sixth embodiment of the present invention. The meaning of bilateral symmetry has been described above.

Figure 27:
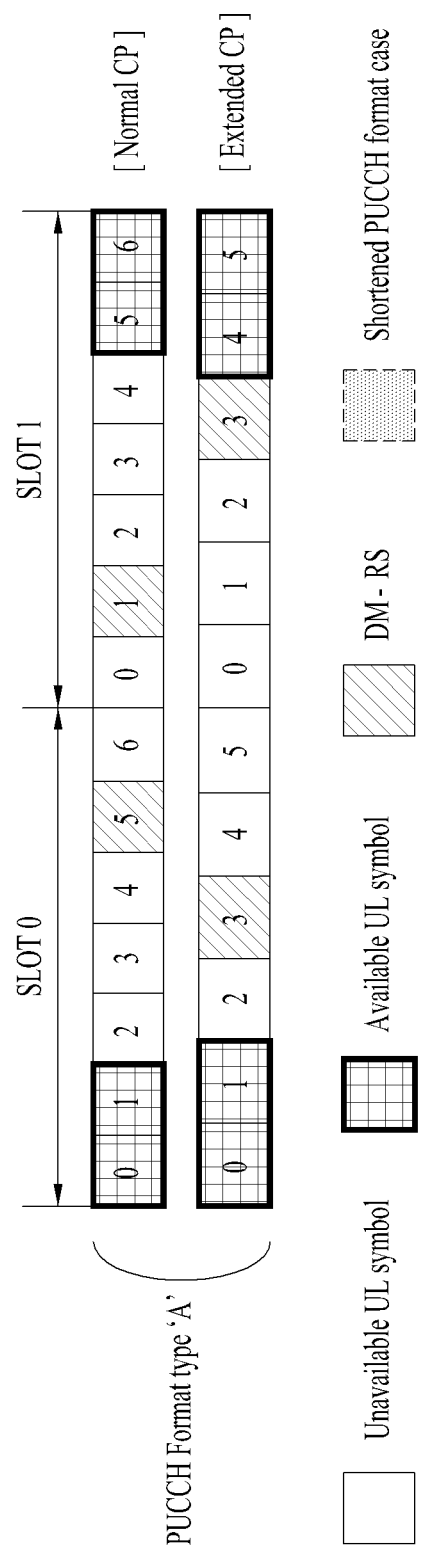
FIG. 27 illustrates another PUCCH format according to the sixth embodiment of the present invention.

FIG. 27 illustrates another PUCCH format structure according to the sixth embodiment of the present invention. Particularly in FIG. 27, the first two symbols and the last two symbols of a backhaul UL subframe are punctured.

Referring to FIG. 27, after the structure of the first slot in PUCCH format type A according to any of the first, third, and fourth embodiments of the present invention is used to be bilaterally symmetrical in the second slot with respect to a slot boundary, the orthogonal sequence method used in the first slot, for example, any of orthogonal sequence 1-b of [Table 11], orthogonal sequence 3-b of [Table 13], and orthogonal sequence 4-b of [Table 14] is used to be bilaterally symmetrical in the second slot, in the sixth embodiment of the present invention.

The PUCCH format structure (i.e. PUCCH format type A) and the orthogonal sequence method according to the sixth embodiment of the present invention may be used as a modified PUCCH format of (3GPP LTE-based) PUCCH format 3 (e.g. modified PUCCH format 3).

Embodiment 7

(1) If the first and second symbols of a backhaul UL subframe are punctured, PUCCH format type A and an orthogonal sequence allocation method for PUCCH DM-RSs in a normal CP case, from among the PUCCH format structures proposed in the above embodiments of the present invention, may be used as a modified PUCCH format of (3GPP LTE-based) PUCCH format 2/2a/2b (e.g. modified PUCCH format 2/2a/2b). This method can be extended to the case where a shortened PUCCH format is configured, every case where a general PUCCH format is used, the case where only a general PUCCH format is used, or the case where only a shortened PUCCH format is used.

PUCCH format type A and an orthogonal sequence allocation method for PUCCH DM-RSs in a normal CP case, from among the PUCCH format structures proposed in the above embodiments of the present invention, may be used as a modified PUCCH format of (3GPP LTE-based) PUCCH format 2/2a/2b (modified PUCCH format 2/2a/2b), and when CQI information is multiplexed with ACK/NACK information, the ACK/NACK information (i.e. ACK/NACK modulation symbols) may be mapped to the second PUCCH DM-RS symbol of each slot. This method may also be extended to the case where a shortened PUCCH format is configured, every case where a general PUCCH format is used, the case where only a general PUCCH format is used, or the case where only a shortened PUCCH format is applied.

For example, ACK/NACK information may be mapped to UL symbol #5 of the first slot and UL symbol #5 of the second slot in the first embodiment of the present invention. Symbols referred to for acquiring information about a phase reference needed to decode the ACK/NACK information, that is, reference symbols may be UL symbol #1 of the first slot and UL symbol #1 of the second slot.

In the second embodiment of the present invention, ACK/NACK information may be mapped to UL symbol #5 of the first slot and UL symbol #5 of the second slot. Reference symbols for the ACK/NACK information may be UL symbol #3 of the first slot and UL symbol #1 of the second slot.

In the third embodiment of the present invention, ACK/NACK information may be mapped to UL symbol #5 of the first slot and UL symbol #4 of the second slot. Reference symbols for the ACK/NACK information may be UL symbol #2 of the first slot and UL symbol #1 of the second slot.

In the fourth embodiment of the present invention, ACK/NACK information may be mapped to UL symbol #5 of the first slot and UL symbol #3 of the second slot. Reference symbols for the ACK/NACK information may be UL symbol #3 of the first slot and UL symbol #1 of the second slot.

(2) If the first and second symbols of a backhaul UL subframe are punctured, PUCCH format type A and an orthogonal sequence allocation method for PUCCH DM-RSs in an extended CP case, among the PUCCH format structures proposed in the above embodiments of the present invention, may be used as a modified PUCCH format of (3GPP LTE-based) PUCCH format 2 (e.g. modified PUCCH format 2). This method can be extended to the case where a shortened PUCCH format is configured, every case where a general PUCCH format is used, the case where only a general PUCCH format is used, or the case where only a shortened PUCCH format is applied. For example, it is assumed that K M-RNs out of total L M-RNs using the same UL subframe timing (e.g. the afore-described third UL subframe timing) within the cell coverage of an MeNB use a specific PUCCH format structure and a specific orthogonal sequence allocation method from among the proposed methods (i.e. the first to sixth embodiments of the present invention) due to puncturing of the first two symbols of a backhaul UL subframe.

Control information of the K M-RNs, that is, RN PUCCHs of the K M-RNs may be multiplexed in a specific (additional) PUCCH resource region (i.e. RB) preset by higher-layer signaling from an eNB, for a situation requiring a specific PUCCH format structure other than a conventional PUCCH format structure. In addition, the eNB may transmit information about the specific PUCCH format structure to a UE by higher-layer signaling.

The same PUCCH format may be configured for the M-RNs using the specific (additional) PUCCH resource region and the eNB may indicate to the M-RNs as many specific PUCCH resource regions as PUCCH formats used in the system by higher-layer signaling, to support multiplexing of control information in the same PUCCH format structure.

In another method, different specific PUCCH format structures may be multiplexed in the same PUCCH resource region. For example, PUCCH format 2/2a/2b (or modified PUCCH format 2/2a/2b) and PUCCH format 1/1a/1b (or modified PUCCH format 1/1a/1b) may be multiplexed in the same PUCCH resource region. In this case, the eNB may indicate fewer (additional) PUCCH resource regions than PUCCH formats used in the system to the M-RNs, for multiplexing. For example, PUCCH format 2/2a/2b may be multiplexed with modified PUCCH format 2/2a/2b. Similarly, PUCCH format 1/1a/1b may be multiplexed with modified PUCCH format 1/1a/1b.

(3) In addition, i) the eNB may command the M-RN to always use only a specific PUCCH format structure. In this case, the eNB may indicate only one PUCCH resource region to the M-RN by higher-layer signaling or physical-layer signaling in an embodiment of the present invention.

ii) The M-RN may dynamically change a PUCCH format structure according to the number of UL symbols punctured in a backhaul UL subframe. For example, the eNB may indicate information indicating which one of methods i) and ii) as a preset indicator (e.g. a 1-bit indicator) to a UE by higher-layer signaling or physical-layer signaling. In this case, as many additional PUCCH resource regions as PUCCH formats available to the M-RN may be indicated in advance by higher-layer signaling or physical-layer signaling.

In another method, if different specific PUCCH format structures are multiplexed in the same PUCCH resource region, for example, if PUCCH format 2/2a/2b (or modified PUCCH format 2/2a/2b) and PUCCH format 1/1a/1b (or modified PUCCH format 1/1a/1b) are multiplexed in the same PUCCH resource region, the eNB may indicate to the M-RN fewer (separated) PUCCH resource regions than PUCCH formats available to the M-RN. In the above multiplexing example, PUCCH format 2/2a/2b may be multiplexed with modified PUCCH format 2/2a/2b. Similarly, PUCCH format 1/1a/1b may be multiplexed with modified PUCCH format 1/1a/1b.

The eNB and the M-RN may determine the number of current punctured UL symbols based on timing-related signaling or feedback information and the transmission/reception timing of DL data. Therefore, the eNB may determine implicitly a PUCCH format structure in which the M-RN will transmit UL information currently.

iii) In another method, the eNB may change a PUCCH format structure for UCI transmission by indicating to the M-RN a threshold P_S_th for the number of punctured UL symbols at which an existing PUCCH format structure is to be switched to a modified PUCCH format structure (i.e. PUCCH formats according to the first to sixth embodiments of the present invention) by higher-layer signaling or physical-layer signaling. The eNB may indicate one or more thresholds P_S_th by higher-layer signaling or physical-layer signaling.

For example, in the case where the eNB notifies the M-RN of only one P_S_th value (by higher-layer signaling or physical-layer signaling), if P_S_th is set to 2, the M-RN switches from an existing PUCCH format structure to a modified PUCCH format structure according to the afore-described embodiments of the present invention, when the number of punctured UL symbols is 2 or larger.

In another example, in the case where the eNB notifies the M-RN of two P_S_th values (by higher-layer signaling or physical-layer signaling), if P_S_th is set to 2 and 3, the M-RN switches from an existing PUCCH format structure to modified PUCCH format structure "X", when the number of punctured UL symbols is 2 and to modified PUCCH format structure "Y", when the number of punctured UL symbols is 3 or larger. A modified PUCCH format structure may be selected according to a change in the number of punctured UL symbols in a preset rule between the eNB and the M-RN (e.g. the relationship between the number of punctured UL symbols and a corresponding modified PUCCH format structure).

The first to seventh embodiments of the present invention may be extended to a case where the last two symbols (or the last one symbol) of a backhaul UL subframe are punctured as well as a case where the first two symbols (or the first one symbol) of a backhaul UL subframe are punctured.

In addition, if the multiplexing capacities of the first and second slots are X and Y, respectively, a final multiplexing capacity for UCI transmission may be determined by MIN (X, Y) (or MAX (X, Y)) in the first to seventh embodiments of the present invention. If the multiplexing capacity of DM-RSs is X and the multiplexing capacity of UL symbols to which the payload of control information is mapped is Y, a final multiplexing capacity for UCI transmission may be determined by MIN (X, Y) (or MAX (X, Y)) in the first to seventh embodiments of the present invention. Herein, a multiplexing capacity may be defined as the number of available symbols (e.g. the number of symbols available for DM-RS mapping or the number of symbols available for mapping control information payload. It may be regulated that j in <i→j> is determined based on the final multiplexing capacity of UCI transmission, when only a part of total orthogonal sequence candidates listed in a specific table are selected. This rule may be extended to allocation of an orthogonal sequence to UL symbols to which the payload of control information is mapped as well as to allocation of an orthogonal sequence to UL symbols to which DM-RSs are mapped.

The first to sixth embodiments of the present invention may be extended to UL communication between an eNB and an F-RN, between an eNB and a UE, and between an F(M)-RN and a UE as well as UL communication between an eNB and an M-RN. Further, the proposed methods are applicable to any of the first to fourth UL subframe timings and may be optionally applied or extended as modified PUCCH formats, when the first or last symbols of a backhaul UL subframe are punctured.

The proposed methods may be extended to any case where UCI transmission or UL data transmission cannot be performed normally for various reasons between a transmitter and a receiver (e.g. a propagation delay, a timing advance, or a switching time required due to a changed usage of radio resources).

If a subframe configuration is UU, that is, a subframe configuration with UL subframe and UL subframe is changed to a subframe configuration DU, that is, a subframe configuration with DL subframe and UL subframe, this case corresponds to a changed usage of radio resources. In this case, the changed DL subframe may overlap with one or more symbols of a following UL subframe due to a propagation delay. Then the one or more symbols of the following UL subframe may be punctured and the present invention may be extended to a PUSCH or PUCCH transmittable in the following UL subframe (e.g., a UL subframe with one or more starting symbols punctured).

The proposed methods may be extended to a case where UCI (or UL data) cannot be transmitted normally for reasons similar to the above-described reasons in a CA environment (e.g. an extended carrier is used for CA) or a Device to Device (D2D) environment.

Figure 28:
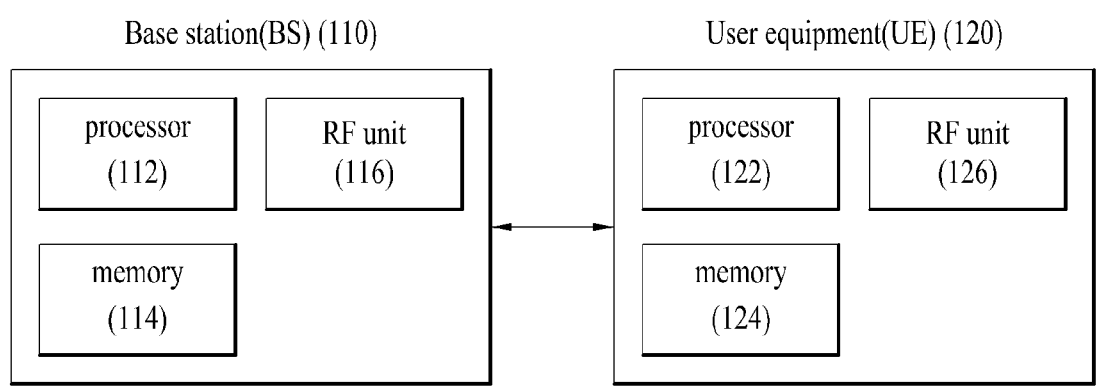
FIG. 28 is a block diagram of a Base Station (BS) and a UE that are applicable to the embodiments of the present invention.

FIG. 28 is a block diagram of a BS and a UE that are applicable to embodiments of the present invention. Backhaul link communication takes place between a BS and an RN and access link communication takes place between an RN and a UE. Accordingly, the BS and the UE may be replaced with the RN under circumstances in FIG. 28.

Referring to FIG. 28, a wireless communication system includes a BS 110 and a UE 120. The BS 110 includes a processor 112, a memory 114, and an RF unit 116. The processor 112 may be configured to perform the proposed procedures and/or methods according to the present invention. The memory 114 is connected to the processor 112 and stores various information related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an Advanced Base Station (ABS), an access point, etc. The term terminal may be replaced with a UE, a Mobile Station (MS), a Subscriber Station (SS), a Mobile Subscriber Station (MSS), a mobile terminal, an Advanced Mobile Station (AMS), etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication apparatus such as a UE, an RN, an eNB, etc.

The invention claimed is:

1. A method for transmitting uplink control information to a transmitter at a receiver in a wireless communication system, the method comprising:
    mapping the uplink control information to one or more available symbols except for unavailable symbols included in each of first and second slots of a specific subframe,
    wherein the unavailable symbols are first and second symbols included in the first slot of the specific subframe, and
    wherein the first and second symbols are punctuated based on transmission and reception timing of the receiver and the transmitter;
    determining a first orthogonal sequence for the first slot of the specific subframe according to a number of available symbols included in the first slot of the specific subframe;
    determining a second orthogonal sequence for the second slot of the specific subframe according to a number of available symbols included in the second slot of the specific subframe;
    applying the first orthogonal sequence to the uplink control information mapped to the first slot;
    applying the second orthogonal sequence to the uplink control information mapped to the second slot; and
    transmitting, to the transmitter, the uplink control information to which the first and second orthogonal sequences are applied,
    wherein one or more symbols used to transmit a reference signal are transmitted on the symbols of the first slot except for the punctured first and second symbols and the symbols of the second slot, and
    wherein the one or more symbols used to transmit the reference signal are distributed symmetrically about a slot boundary between the first and second slots.

2. The method according to claim 1, wherein one or more symbols used to transmit a transmit the reference signal in each of the first and second slots are excluded from the available symbols.

3. The method according to claim 1, wherein one or more first symbols of the specific subframe are the unavailable symbols.

4. The method according to claim 1, wherein one or more last symbols of the specific subframe are the unavailable symbols.

5. A receiver in a wireless communication system, the receiver comprising:
a processor configured to:
- map uplink control information to one or more available symbols except for unavailable symbols included in each of first and second slots of a specific subframe,
- wherein the unavailable symbols are first and second symbols included in the first slot of the specific subframe, and
- wherein the first and second symbols are punctuated based on transmission and reception timing of the receiver and the transmitter,
- determine a first orthogonal sequence for the first slot of the specific subframe according to a number of available symbols included in the first slot of the specific subframe,
- determine a second orthogonal sequence for the second slot of the specific subframe according to a number of available symbols included in the second slot of the specific subframe,
- apply the first orthogonal sequence to the uplink control information mapped to the first slot, and
- apply the second orthogonal sequence to the uplink control information mapped to the second slot; and a wireless communication module configured to transmit, to the transmitter, the uplink control information to which the first and second orthogonal sequences are applied,
wherein one or more symbols used to transmit a reference signal are transmitted on the symbols of the first slot except for the punctured first and second symbols and the symbols of the second slot, and
wherein the one or more symbols used to transmit the reference signal are distributed symmetrically about a slot boundary between the first and second slots.

6. The receiver according to claim 5, wherein one or more symbols used to transmit the reference signal in each of the first and second slots are excluded from the available symbols.

7. The receiver according to claim 5, wherein one or more first symbols of the specific subframe are the unavailable symbols.

8. The receiver according to claim 5, wherein one or more last symbols of the specific subframe are the unavailable symbols.

* * * * *